(12) United States Patent
Kilaru et al.

(10) Patent No.: US 10,889,152 B2
(45) Date of Patent: Jan. 12, 2021

(54) SYSTEMS, APPARATUS, AND METHODS TO DETERMINE VEHICLE TIRE WEAR

(71) Applicant: TOYOTA MOTOR NORTH AMERICA, INC., Plano, TX (US)

(72) Inventors: Raja Shekar Kilaru, Plano, TX (US); Joshua Cocke Batie, Frisco, TX (US); Aghyad Majdi Saleh, Grand Prairie, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 20 days.

(21) Appl. No.: 16/199,002

(22) Filed: Nov. 23, 2018

(65) Prior Publication Data

US 2020/0164695 A1 May 28, 2020

(51) Int. Cl.
| | | |
|---|---|---|
| B60C 11/24 | (2006.01) | |
| G07C 5/08 | (2006.01) | |
| B60W 40/09 | (2012.01) | |

(52) U.S. Cl.
CPC .......... B60C 11/246 (2013.01); G07C 5/0808 (2013.01); *B60W 40/09* (2013.01); *B60W 2520/105* (2013.01); *B60W 2520/125* (2013.01); *B60W 2520/28* (2013.01); *B60W 2530/14* (2013.01); *B60W 2530/20* (2013.01)

(58) Field of Classification Search
None
See application file for complete search history.

(56) References Cited

U.S. PATENT DOCUMENTS

| | | |
|---|---|---|
| 3,933,036 A | 1/1976 | Lippmann et al. |
| 5,557,552 A | 9/1996 | Naito et al. |
| 7,228,732 B2 | 6/2007 | Turner et al. |
| 7,320,246 B2 | 1/2008 | Schick et al. |
| 7,483,794 B2 | 1/2009 | Bocquillon et al. |
| 9,376,118 B2 * | 6/2016 | Benedict ............... B60W 40/12 |
| 9,513,192 B2 | 12/2016 | Kretschmann et al. |
| 9,610,810 B1 | 4/2017 | Singh |
| 9,821,611 B2 | 11/2017 | Singh |
| 9,873,293 B2 | 1/2018 | Singh et al. |
| 2005/0150283 A1 * | 7/2005 | Shick ...................... B60C 11/24 73/146 |
| 2008/0209995 A1 * | 9/2008 | Taylor ................... G01L 17/005 73/146 |
| 2015/0029016 A1 * | 1/2015 | Lesesky ................ B60C 23/045 340/442 |
| 2019/0001757 A1 * | 1/2019 | Singh .................. B60C 23/0474 |
| 2020/0001662 A1 * | 1/2020 | Storti .................... B60C 11/246 |

* cited by examiner

*Primary Examiner* — Tamara L Weber
(74) *Attorney, Agent, or Firm* — Oblon, McClelland, Maier & Neustadt, L.L.P.

(57) ABSTRACT

Systems, apparatus, and methods to determine vehicle tire wear are disclosed. A disclosed apparatus includes a vehicle controller configured to determine, based on data associated with operation of a vehicle, behavior of one or more drivers of the vehicle that causes tire wear. The controller is also configured to calculate, based on the behavior, a condition of a tire of the vehicle. The controller is also configured to generate, via an output device, a notification indicating the condition of the tire to a user.

20 Claims, 16 Drawing Sheets

SYSTEMS, APPARATUS, AND METHODS TO DETERMINE VEHICLE TIRE WEAR

FIELD OF THE DISCLOSURE

This disclosure relates generally to vehicles and, more particularly, to systems, apparatus, and methods to determine vehicle tire wear.

BACKGROUND

Motor vehicles typically employ tires to provide traction while driving. Some vehicle tires include tread having grooves formed by an outer surface of the tread, which improves vehicle handling, maneuverability, and/or safety during certain driving conditions. For example, when driving on a wet surface (e.g., concrete), the grooves facilitate moving water on the surface away from a particular area of tread that engages the surface, which prevents hydroplaning and/or wheel slip. To ensure proper performance, the vehicle tires need to be regularly maintained (e.g., rotated, replaced, repaired, etc.).

SUMMARY

An example apparatus includes a vehicle controller. The vehicle controller is configured to determine, based on data associated with operation of a vehicle, behavior of one or more drivers of the vehicle that causes tire wear. The controller is also configured to calculate, based on the behavior, a condition of a tire of the vehicle. The controller is also configured to generate, via an output device, a notification indicating the condition of the tire to a user.

An example tangible machine-readable medium includes instructions that, when executed, cause a processor to at least determine, based on data associated with operation of a vehicle, behavior of one or more drivers of the vehicle that causes tire wear. The instructions also cause the processor to calculate, based on the behavior, a condition of a tire of the vehicle. The instructions also cause the processor to generate, via an output device, a notification indicating the condition of the tire to a user.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figure 1:
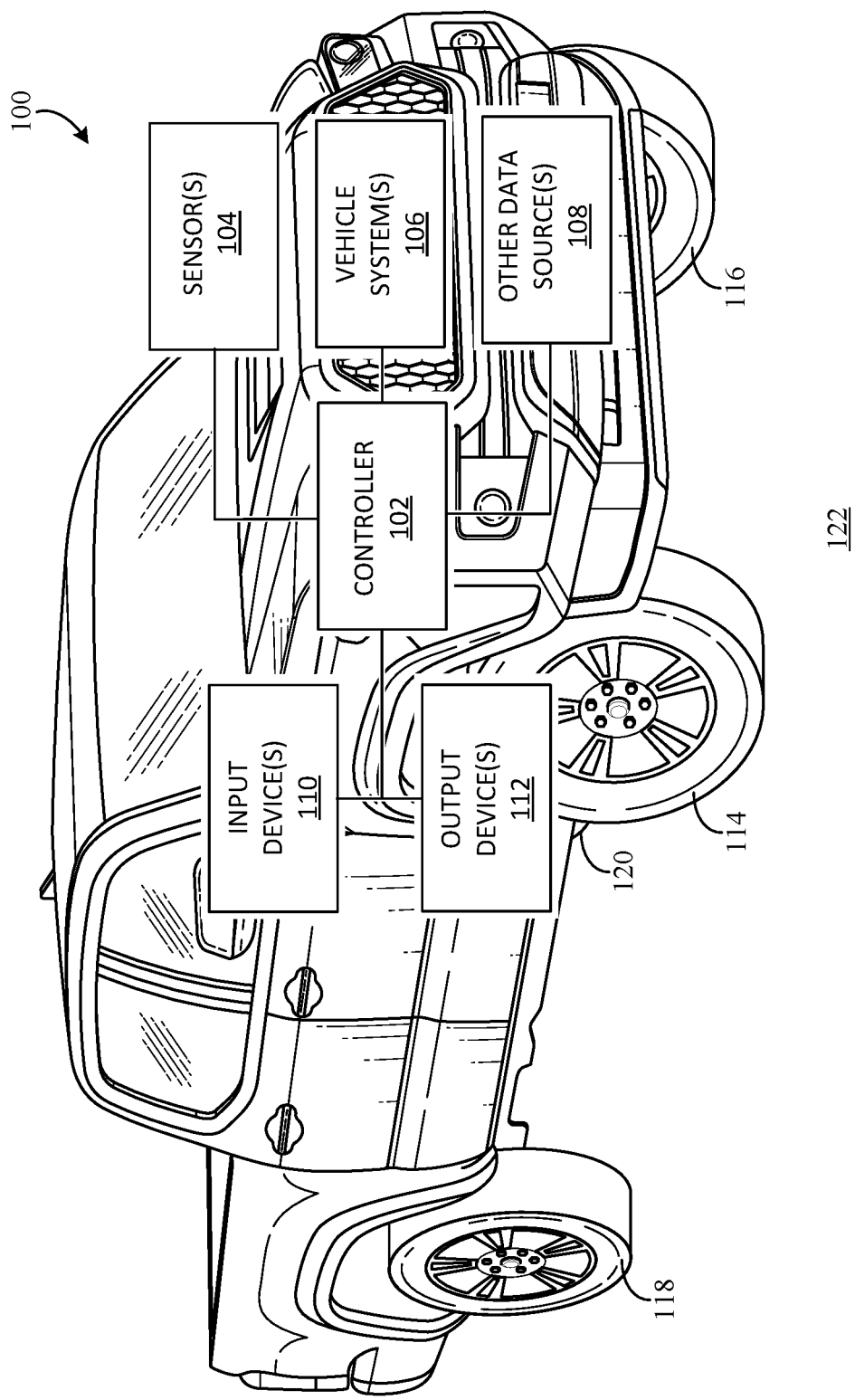
FIG. 1 is a view of an example vehicle in which examples disclosed herein can be implemented.

Vehicle tire wear is typically assessed by a person. For example, vehicle servicer personnel visually inspect a tire and/or use tools to identify a depth at which grooves extend into tire tread, which indicates whether the tire is worn (e.g., bald). Worn tire tread may adversely affect vehicle performance and/or handling during certain driving conditions, for example, by causing hydroplaning, wheel slip, etc. However, some tire defects may not be visibly apparent to a person. As a result, such known methods of determining tire wear are prone to inaccuracies due to user error, which may leave vehicle tires improperly maintained.

Systems, apparatus, and methods to determine vehicle tire wear are disclosed. Examples disclosed herein provide an example vehicle controller (e.g., an electronic control unit (ECU)) that determines, based on historical information or data obtained from various big data sources during operation of a vehicle, particular habits, patterns, and/or otherwise behavior of one or more drivers of the vehicle that are indicative of tire wear. For example, a driver who suddenly and/or excessively performs maneuvers of a vehicle such as turning, braking, and/or throttling causes vehicle tire tread to predictably wear and/or degrade. Similarly, a driver who repeatedly causes a vehicle tire to hit objects (e.g., a curb, a sidewalk, a speed bump, road debris, etc.) and/or potholes, drives the vehicle at excessive speeds, drives the vehicle on poor road conditions, and/or drives the vehicle with relatively low or high tire fluid pressure causes the vehicle tire tread to predictably wear and/or degrade. Such behavior of driver(s) is sometimes referred to herein as driver behavior of interest or behavior of interest. The disclosed controller receives this historical data from one or more vehicle sensors (e.g., an accelerometer, a wheel speed sensor, a tire pressure sensor, etc.), one or more vehicle systems (e.g., an anti-lock braking system (ABS)), a global positioning system (GPS), etc.), one or more networks (e.g., a vehicle control area network (CAN), the Internet, etc.), etc. The controller then processes this historical data to determine the disclosed behavior of interest, for example, by identifying particular signatures, trends, and/or characteristics in the historical data indicative of such behavior, which is discussed in greater detail below in connection with FIGS. 7-14.

In particular, the disclosed vehicle controller calculates, via a predictive model, a health status or condition (e.g., one or more areas of tread that are worn, tread depth in the area(s), etc.) of one or more tires of the vehicle based on the determined behavior of the driver(s). The predictive model correlates one or more parameters and/or characteristics (e.g., a number of occurrences and/or skid parameters caused by sudden and/or excessive maneuvers) of the driver behavior to a degree or an amount of wear in a particular area (e.g., a left portion, a central portion, and/or right portion) of a tire. For example, the predictive model is based on one or more empirical relationships defined between the driver behavior of interest and trends of tread wear identified in nominal tires. In this manner, disclosed examples accurately and rapidly assess, in real-time, the condition of the vehicle tire(s) to determine whether the tire(s) have defect(s) (e.g., abnormal wear) in comparison to one or more of the identified trends, which would have otherwise been unattainable using the above mentioned known methods or techniques.

After calculating the condition of the tire(s), the controller controls an output device (e.g., a mobile device of a driver, a screen in the vehicle, a speaker or audio transducer in the vehicle, etc.) to notify a person (e.g., a driver, vehicle servicer personnel, etc.) of the condition of the tire(s) and/or instruct the person to maintain the tire(s). As a result, disclosed examples assist the person in maintaining one or more vehicle tires and address the limitations typically associated with the above mentioned known methods or techniques of assessing tire wear. Further, disclosed examples reduce lead time and improve accuracy in determining vehicle tire wear.

FIG. 1 is a view of an example vehicle (e.g., a car, a van, a truck, a sport utility vehicle (SUV), etc.) 100 in which examples disclosed herein can be implemented. According to the illustrated example of FIG. 1, the vehicle 100 includes an example controller 102, one or more sensors 104, one or more vehicle systems 106, one or more other data sources 108, one or more example input device(s) 110, one or more example output devices 112, and one or more examples tires 114, 116, 118, 120 (sometimes referred to as road wheels), four of which are shown in this examples, (i.e., a first or front tire 114, a second or front tire 116, a third or rear tire 118, and a fourth or rear tire 120). The tires 114, 116, 118, 120 of FIG. 1 engage an example driving surface (e.g., concrete, asphalt, dirt, sand, etc.) 122 on which the vehicle 100 is positioned to provide traction to the vehicle 100 while driving. The controller 102 of FIG. 1 is configured to detect and/or determine a particular condition of one or more of the tires 114, 116, 118, 120 via data obtained from the sensor(s) 104, the vehicle system(s) 106, and/or the other data source(s) 108, as discussed further below in connection with FIGS. 2-16. In particular, in response to determining the tire(s) 114, 116, 118, 120 are worn and/or otherwise likely require maintenance, the controller 102 advantageously controls the output device(s) 112 to notify a person (e.g., a driver of the vehicle 100, vehicle servicer personnel, etc.) of the tire condition and/or instruct the person to repair, replace, rotate, and/or otherwise maintain the tire(s) 114, 116, 118, 120. In this manner, disclosed examples assist the person in properly maintaining the vehicle 100.

The controller 102 of FIG. 1 is implemented, for example, using one or more ECUs. In particular, the controller 102 is communicatively coupled to the sensor(s) 104, the vehicle system(s) 106, the other data sources 108, and the input device(s) 110 to receive data therefrom, for example, via a transmission or signal wire, a bus (e.g., a vehicle CAN), radio frequency, etc. Further, the controller 102 is communicatively coupled to the output device(s) 106 to control output thereof for the person, for example, via a transmission or signal wire, a bus (e.g., a vehicle CAN), radio frequency, etc.

The sensor(s) 104 of FIG. 1 include one or more accelerometers, one or more gyroscopes, one or more wheel speed sensors, one or more yaw rate sensors, one or more wheel speed sensors, one or more tire pressure sensors, one or more brake pressure sensors, one or more throttle position sensors, one or more cameras, one or more GPS locators, and/or any other appropriate sensor(s) that enable or facilitate functionality for the vehicle 100, improve vehicle performance, and/or improve vehicle safety. In particular, the sensor(s) 104 are operatively coupled to the vehicle 100 and configured to generate, obtain, and/or otherwise provide data associated with the vehicle 100 and/or the driving surface 122. For example, the sensor(s) 104 detect and/or determine one or more rotational wheel parameters (e.g., a wheel speed, a wheel acceleration, a wheel deceleration, etc.) associated with one or more of the tires 114, 116, 118, 120. In another example, the sensor(s) 104 detect and/or determine one or more accelerations (e.g., one or more of a transverse acceleration, a longitudinal acceleration, and/or a vertical acceleration) of the vehicle 100. Conversely, in yet another example, the sensor(s) 104 detect and/or determine a deceleration (e.g., a longitudinal deceleration) of the vehicle 100. In yet another example, the sensor(s) 104 detect and/or determine a brake fluid pressure of the vehicle 100. In yet another example, the sensor(s) 104 detect and/or determine a fluid pressure of one or more of the tires 114, 116, 118, 120, which is sometimes referred to as a tire fluid pressure. In yet another example, the sensor(s) 104 detect and/or determine a yaw rate of the vehicle 100.

The vehicle system(s) 106 of FIG. 1 include one or more systems and/or subsystems that facilitate operation of the vehicle 100 such as, for example, one or more of an ABS, a throttle system, an odometer system, and/or a GPS system. In some examples, the ABS includes a brake controller (e.g., an ECU) configured to control, via an actuator, the brake fluid pressure of the vehicle 100 in response to a driver of the vehicle 100 exhibiting particular braking behavior. For example, the ABS detects when the driver is braking suddenly and/or excessively and, in response, causes the brake fluid pressure to increase and decrease (e.g., at a predetermined periodic frequency), thereby reducing wheel slip or lock-up. In particular, the ABS provides associated data to the controller 102 corresponding to such a braking event.

The other data source(s) 108 include one or more networks such as, for example, a CAN bus of the vehicle 100, the Internet, etc. In such examples, the other data source(s) 108 provide data to the controller 104 indicative of one or more parameters (e.g., a distance or length) and/or characteristics (e.g., road type) of the driving surface 122 on which the vehicle 100 drives and/or has driven.

The input device(s) 110 of FIG. 1 include one or more of a button, a switch, a touchscreen, a microphone, etc. such that a person can interact with the input device(s) 110. In particular, the input device(s) 110 are communicatively coupled to the controller 102 to provided user data, inputs, and/or selections thereto.

The output device(s) 112 of FIG. 1 include one or more electronic device(s) for providing information (e.g., visual and/or audible information) to a person such as, for example one or more of a mobile device, a screen, a speaker or audio transducer. In particular, the controller 102 controls the output device(s) 106 to generate one or more images, one or more messages, one or more sounds (e.g., a chime), etc. that notify a person of the condition of the tire(s) 114, 116, 118, 120.

Figure 2:
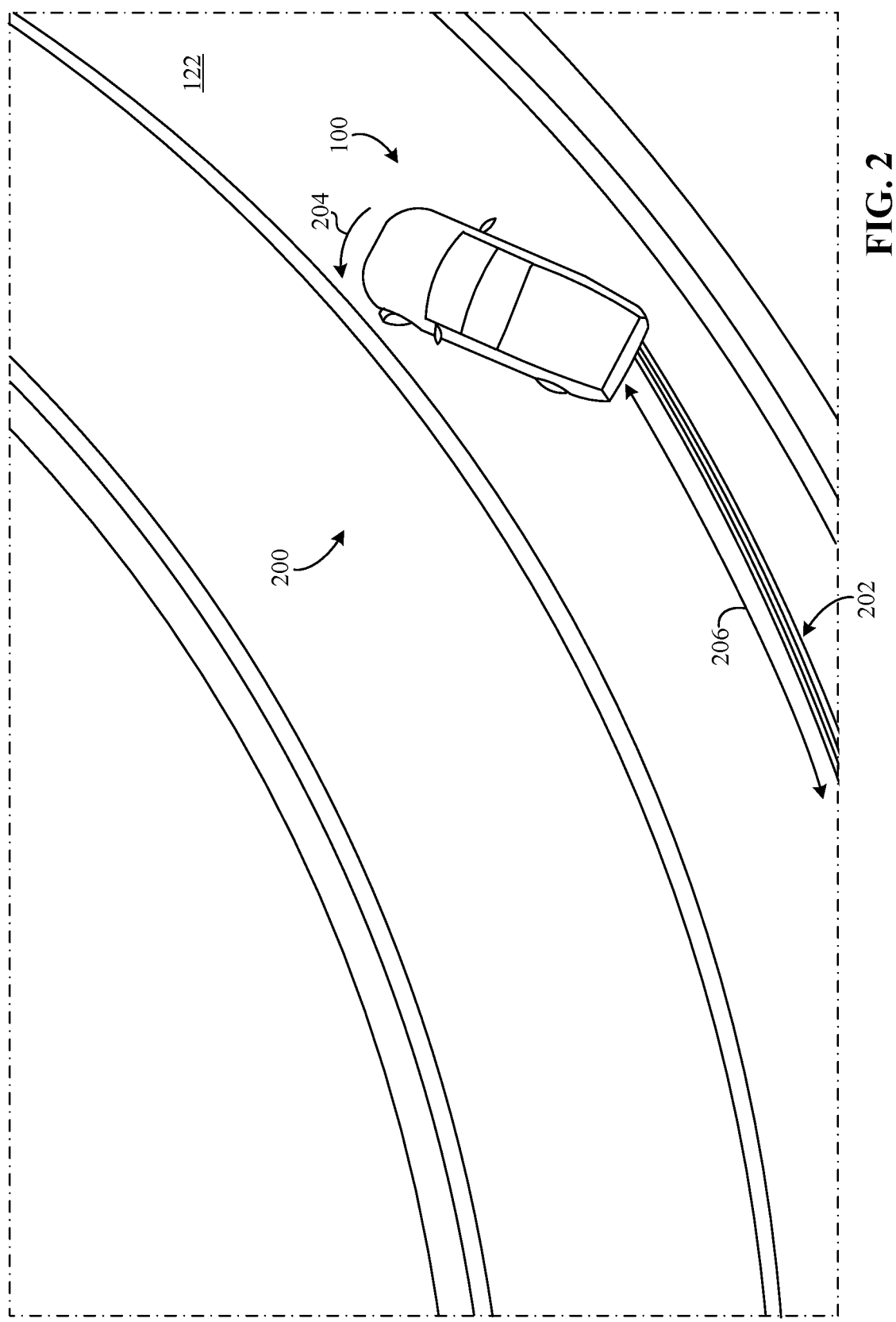
FIGS. 2-5 are other views of the example vehicle of FIG. 1 and show example driver behavior that causes vehicle tire wear.

FIG. 2 is a top-view of the vehicle 100 of FIG. 1 and shows first example driver behavior of interest 200 that causes vehicle tire wear. Accordingly to the illustrated example of FIG. 2, a driver of the vehicle 100 is performing a sudden and/or excessive turn on the driving surface 122 such that the vehicle 100 is skidding and/or drifting. That is, one or more of the tire(s) 114, 116, 118, 120 are slipping relative to the driving surface 122, thereby causing a layer or portion of the affected tire(s) 114, 116, 118, 120 to transfer to the driving surface 122 while the vehicle 100 is turning, which predictably wears and/or degrades associated tire tread. As a result, the tire(s) 114, 116, 118, 120 leave one or more respective skid marks 202 on the driving surface 122, one of which is shown in this example (i.e., a first example skid mark 202).

In some examples, the controller 102 determines, based on historical data associated with operation of the vehicle 100 during such turning events, one or more of: (1) when the vehicle 100 experienced or encountered each turning event; (2) which tire(s) 114, 116, 118, 120 was/were adversely affected by each turning event; and/or (3) how each turning event wore and/or degraded associated tire tread. As shown in FIG. 2, the first skid mark 202 corresponds to the third tire 118 resulting from the vehicle 100 turning or rotating in a particular direction (e.g., counterclockwise) 204. Additionally, the first skid mark 202 has a particular length 206, shape or geometry, and/or a severity associated therewith (sometimes referred to as skid mark parameters), each of which is based on one or more operational parameters associated the vehicle 100 during such turning events. For example, one or more of a rotational parameter of third tire 118 (e.g., wheel speed associated with the third tire 118), a transverse acceleration of the vehicle 100, a longitudinal acceleration or deceleration of the vehicle 100, a speed of the vehicle 100, and/or a yaw rate of the vehicle 100 indicate such skid mark parameters.

Figure 3:
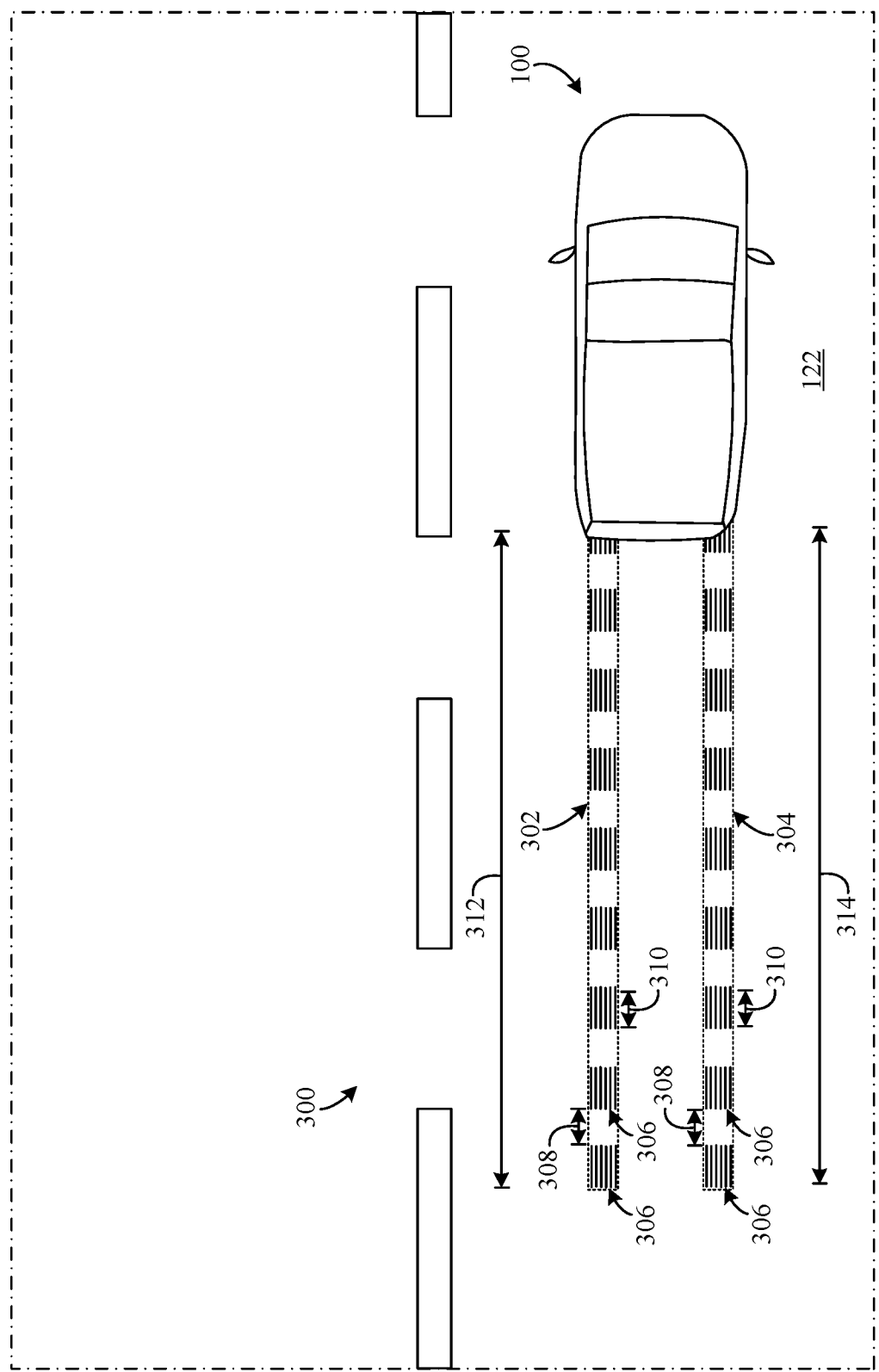

FIG. 3 is another top-view of the vehicle 100 of FIG. 1 and shows second example driver behavior of interest 300 that causes vehicle tire wear. Accordingly to the illustrated example of FIG. 3, the driver of the vehicle 100 is suddenly and/or excessively braking such that the vehicle 100 is skidding. That is, one or more of the tire(s) 114, 116, 118, 120 are slipping and/or locking-up relative to the driving surface 122 while the vehicle 100 is braking, thereby causing a layer of the tire(s) 114, 116, 118, 120 to transfer to the driving surface 122, which predictably wears and/or degrades the tire(s) 114, 116, 118, 120. As a result, the tire(s) 114, 116, 118, 120 leave one or more respective skid marks 302, 304 (as represented by the dotted/dashed lines of FIG. 3) on the driving surface 122, two of which are shown in this example (i.e., a second example skid mark 302 and a fourth example skid mark 304).

In particular, the vehicle 100 of FIG. 3 includes the ABS to assist the driver in reducing wheel slip or lock-up during such a braking event. As a result, the second skid mark 302 and/or the third skid mark 304 have particular skid mark parameters associated therewith due to the ABS controlling the brake fluid pressure of the vehicle 100. For example, as shown in FIG. 3, each of the second and third skid marks 302, 304 includes multiple, relatively small portions 306 resulting from changes in the brake fluid pressure of the vehicle 100 caused by the ABS, which are spaced from each other by a substantially equal distance 308 in this example. That is, each space or distance 308 between adjacent ones of the relatively small skid mark portions 306 correspond to minimums in the changing brake fluid pressure. Further, each of the relatively small skid mark portions 306 has a particular length 310 corresponding to respective peaks or maximums in the changing brake fluid pressure. However, in examples where the vehicle 100 does not include the ABS, the second and third skid marks 302, 304 are substantially continuous and/or uniform along respective lengths 312, 314 thereof.

In some examples, the controller 102 determines, based on historical data associated with operation of the vehicle 100 during such braking events, or more of: (1) when the vehicle 100 experienced or encountered each braking event; (2) which tire(s) 114, 116, 118, 120 was/were adversely affected by each braking event; and/or (3) how each braking event wore and/or degraded associated tire tread. As shown in FIG. 3, the second skid mark 302 corresponds to the second and fourth tires 116, 120 (i.e., the second and fourth tires 116, 120 at least partially slipped or locked-up during the braking event), and the third skid mark 304 corresponds to the first and third tires 114, 118 (i.e., the first and third tires 114, 118 at least partially slipped or locked-up during the braking event). Additionally, the second and third skid marks 302, 304 have the respective lengths 312, 314, each of which is based on one or more operational parameters associated with the vehicle 100 during such braking events. For example, one or more of the brake fluid pressure of the vehicle 100, rotational parameters of the respective tires 114, 116, 118, 120 (i.e., associated wheel speeds), and/or the longitudinal deceleration of the vehicle 100 indicate such skid mark patterns.

Figure 4:
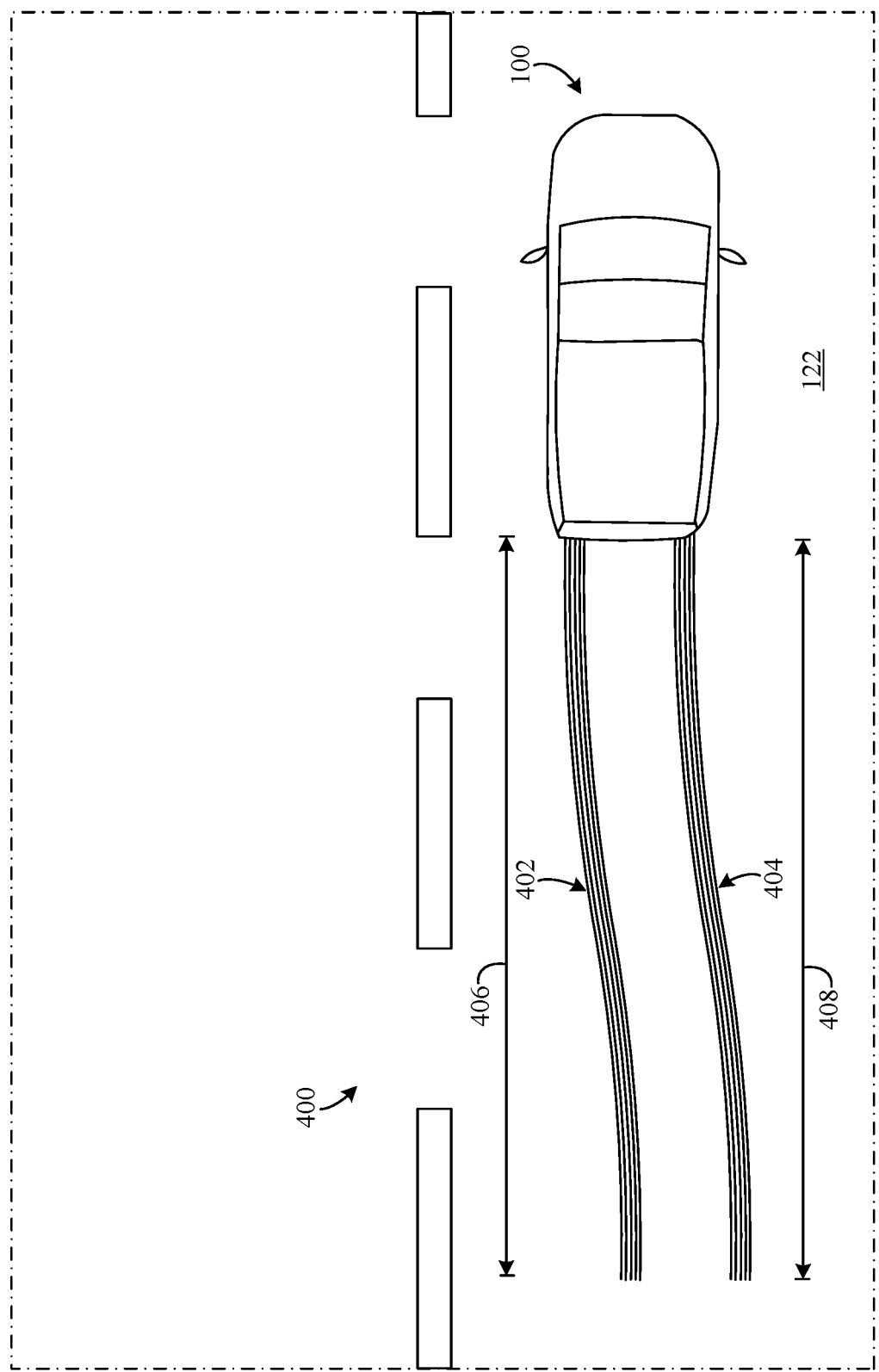

FIG. 4 is another top-view of the vehicle 100 of FIG. 1 and shows third example driver behavior of interest 400 that causes vehicle tire wear. Accordingly to the illustrated example of FIG. 4, the driver of the vehicle 100 is spinning one or more of the tires 114, 116, 118, 120 relative to the driving surface 122. That is, the driver is suddenly and/or excessively throttling the vehicle 100 (e.g., via a gas pedal or accelerator), which is sometimes referred to as a burnout. As a result, layer(s) of the respective ones of the tire(s) 114, 116, 118, 120 transfer to the driving surface 122, which predictably wears and/or degrades associated tire tread. Accordingly, the spinning tire(s) 114, 116, 118, 120 leave one or more respective marks 402, 404 (sometimes referred to as burnout marks) on the driving surface 122, two of which are shown in this example (i.e., a first example burnout mark 402 and a second example burnout mark 404).

In some examples, the controller 102 determines, based on the historical data associated with operation of the vehicle 100 during such throttling events, one or more of: (1) when the vehicle 100 experienced or encountered each throttling event; (2) which tire(s) 114, 116, 118, 120 was/were adversely affected by each throttling event; and/or (3) how each throttling event wore and/or degraded associated tire tread. As shown in FIG. 4, the first burnout mark 402 corresponds to the fourth tire 120, and the second burnout mark 404 corresponds to the third tire 118 (e.g., resulting from the vehicle 100 having rear-wheel drive functionality). Additionally, the first and second burnout marks 402, 404 have respective lengths 406, 408, respective shapes or geometries, and/or respective degrees of harshness associated therewith (sometimes referred to as burnout mark parameters), each of which is based on one or more operational parameters associated with the vehicle 100 during such throttling events. For example, one or more of rotational speeds of the respective third and fourth tires 118, 120 (i.e., wheel speed associated with the respective third and fourth tires 118, 120), the transverse acceleration of the vehicle 100, the longitudinal acceleration or deceleration of the vehicle 100, the speed of the vehicle 100, and/or the yaw rate of the vehicle 100 indicate such burnout mark parameters.

Figure 5:
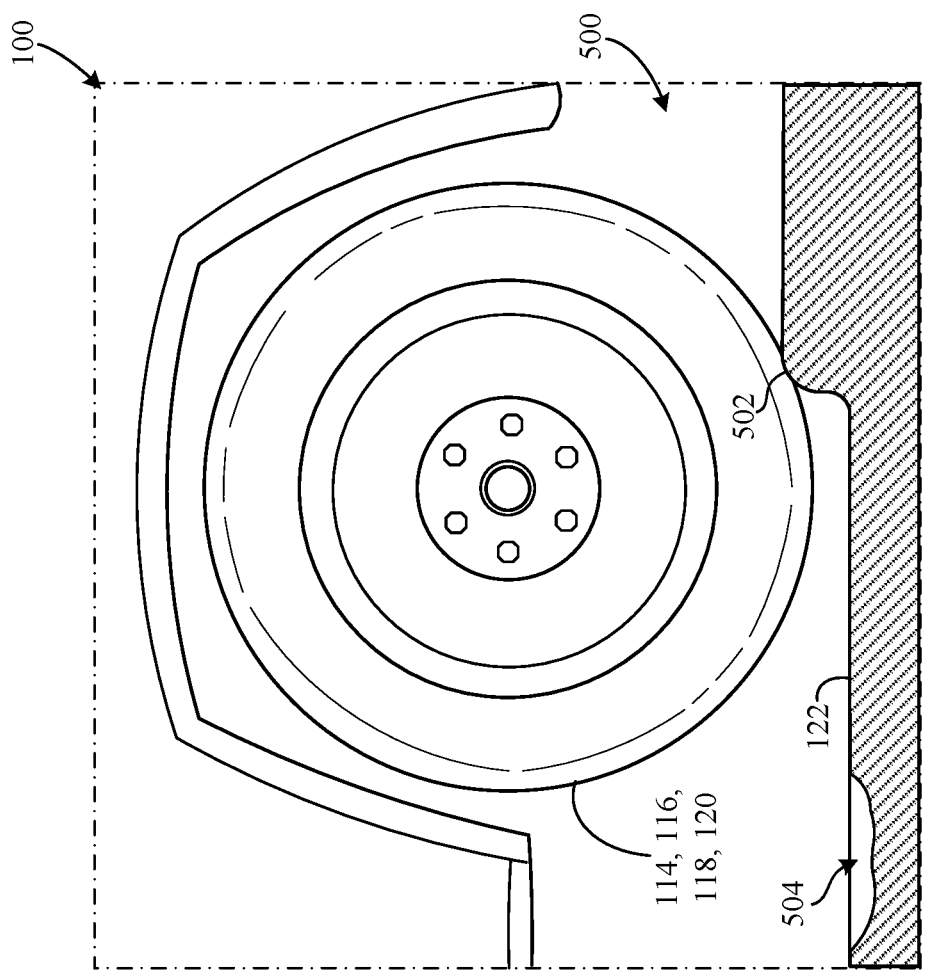

FIG. 5 is a partial side-view of the vehicle 100 of FIG. 1 and shows fourth example driver behavior of interest 500 associated with vehicle tire wear. In particular, one or more of the vehicle tires 114, 116, 118, 120 are engaging or impacting an object and/or a protrusion (e.g., a curb, sidewalk, a speed bump, road debris, etc.) 502 on the driving surface 122, which predictably wears and/or degrades associated tire tread. Similarly, in some examples, the tire(s) 114, 116, 118, 120 engage or impact a recessed area (e.g., a pothole) 504 on the driving surface 122, which predictably wears and/or degrades associated tire tread. In some examples, the controller 102 determines, based on historical driving data associated with the vehicle 100 during such tire impacts, one or more of: (1) when the vehicle 100 experienced or encountered each tire impact while driving; (2) which tire(s) 114, 116, 118, 120 was/were adversely affected by each impact, and/or (3) how each impact wore and/or degraded tire tread.

Figure 6:
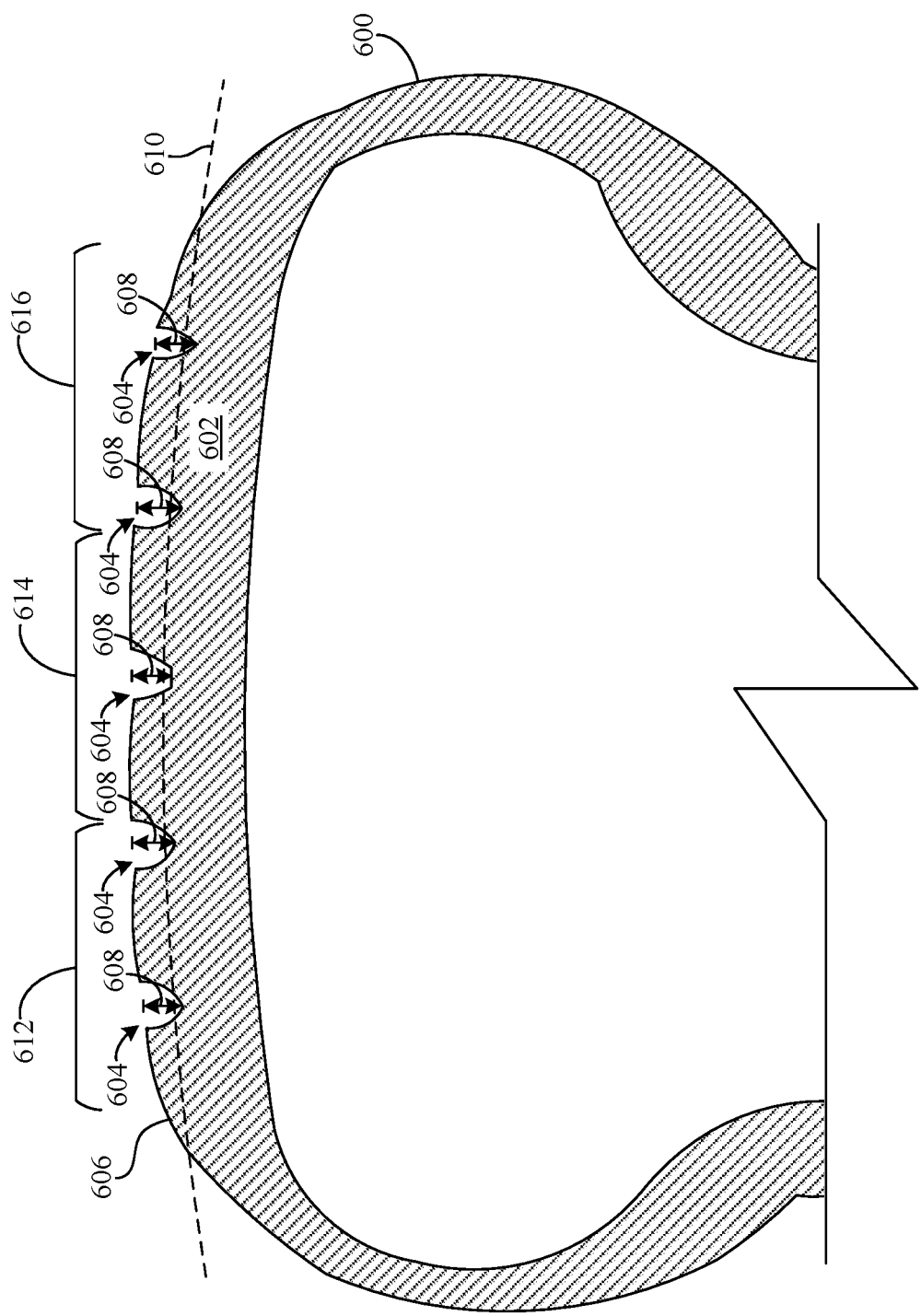
FIG. 6 is a partial cross-sectional view of an example vehicle tire.

FIG. 6 is a partial cross-sectional view of a fifth example vehicle tire 600. In some examples, the fifth tire 600 corresponds to one or more of the tire(s) 114, 116, 118, 120 of FIG. 1. According to the illustrated example of FIG. 6, the fifth tire 600 includes example tread 602 for providing traction to the vehicle 100. The tread 600 of FIG. 6 includes one or more examples grooves 604 formed and/or defined by an outer surface 606 of the tread 600 that engages the driving surface 122, five of which are shown in this example.

Each of the grooves 604 of FIG. 6 extends into the tread 600 by a particular distance. Stated differently, each groove 604 has a particular depth 608 defined by a bottommost (in the orientation of FIG. 6) surface of the groove 604 and a portion of the outer surface 606 that is proximate to and/or surrounds the groove 604, which is sometimes referred to as tread depth. In particular, the groove(s) 604 are sized, shaped, structured, and/or otherwise configured to increase traction by carrying water (and/or any other fluid) away from one or more areas of the outer surface 606 that contact the driving surface 122 as the fifth tire 600 spins or rotates. Accordingly, for the fifth tire 600 to function properly, the groove depth(s) 608 should remain above a particular threshold groove depth 610 (as represented by the dotted/dashed line of FIG. 6). Thus, when at least one of the groove depths 608 falls below the threshold groove depth 610, a corresponding area or portion of the fifth tire 600 is considered to be worn (e.g., excessively worn or bald).

As shown in FIG. 6, the fifth tire 600 includes one or more areas or portions 612, 614, 616 that the controller 102 assesses, three of which are shown in this example. That is, the fifth tire 600 has a first example area (e.g., a leftmost (in the orientation of FIG. 6) or outer area) 612, a second example area (e.g., a central area) 614, and a third example area (e.g., a rightmost (in the orientation of FIG. 6) or outer area) 616. In the illustrated example of FIG. 6, each of the first and second areas 612, 616 includes two of the grooves 604, and the second area 614 includes only one of the grooves 604. In some examples, the controller 102 determines, based on the historical driving data associated with the vehicle 100, which portion(s) 612, 614, 616 of the fifth tire 600 were adversely affected by at least some of the aforementioned driver behavior of interest 200, 300, 400, 500, which is discussed further below. In particular, the controller 102 calculates one or more (e.g., all) of the groove depths 608 based on such behavior of the driver(s) of the vehicle 100.

Figure 7:
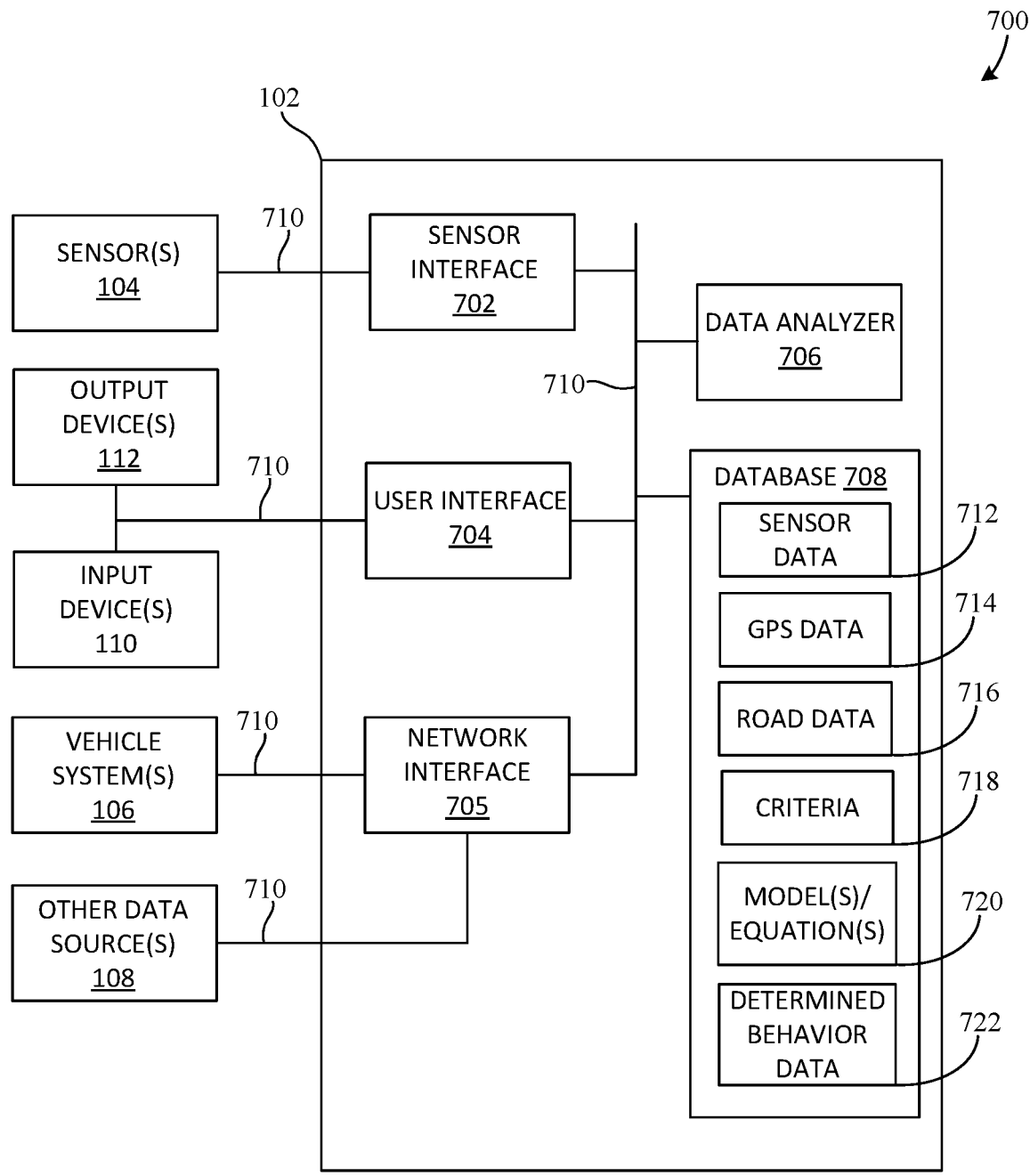
FIG. 7 is a block diagram of an example tire wear determination system to implement the examples disclosed herein.

FIG. 7 is a block diagram of an example tire wear determination system 700 to implement the examples disclosed herein. According to the illustrated example of FIG. 7, the tire wear determination system 700 includes the vehicle controller 102 of FIG. 1, which includes an example sensor interface 702, an example user interface 704, an example network interface 705, an example data analyzer 706, and an example database 708. The tire wear determination system 700 of FIG. 7 also includes the sensor(s) 104 of FIG. 1, the vehicle system(s) 106 of FIG. 1, the other data source(s) 108 of FIG. 1, the input device(s) 110 of FIG. 1, and the output device(s) 112 of FIG. 1. The tire wear determination system 700 is communicatively coupled to the sensor(s) 104, the vehicle system(s) 106, the other data source(s) 108, the input device(s) 110, and the output device(s) 112 via one or more example communication links 710 such as, for example, a signal or transmission wire, a bus (e.g., a CAN), radio frequency, etc. In particular, the tire wear determination system 700 of FIG. 7 detects and/or determines, via processing example data (e.g., stored in the database 708), a condition or health status of one or more of the vehicle tire(s) 114, 116, 118, 120. This data includes historical driving data associated with operation of the vehicle 100 such as, for example, one or more of example sensor data 712, example GPS data 714, and/or example road data 716. Additionally, this data includes example criteria 718 and one or more example model(s)/equation(s) 720, which facilitates determining the tire condition or health. Accordingly, the example data 712, 714, 716, 718, 720 of FIG. 7 enables the tire wear determination system 700 to rapidly and/or accurately determine the condition of the tire(s) 114, 116, 118, 120, as will be discussed further below. In response determining that the tire(s) 114, 116, 118, 120 is/are at least partially worn (e.g., bald), the tire wear determination system 700 directs the output device(s) 112 to notify the person of the tire condition and/or instruct the person to inspect or properly maintain the tire(s) 114, 116, 118, 120.

The sensor interface 702 of FIG. 7 is communicatively coupled, via the link(s) 710, to the sensor(s) 104 to receive the example sensor data 712 therefrom. As such, at least some of the sensor data 712 of FIG. 7 includes one or more of: (1) acceleration and/or deceleration data; (2) rotational wheel parameter data; (3) yaw rate data; (4) tire fluid pressure data; (5) brake fluid pressure data; (6) vehicle mileage data; (7) time stamp data indicating when the sensor data 712 and/or the GPS data 714 was/were generated; and/or (8) any other appropriate sensor data associated with the vehicle 100. In particular, the sensor data 712 indicates to the data analyzer 706 when the driver(s) of the vehicle 100 exhibited particular behavior (e.g., the behavior of interest 200, 300, 400, 500) during vehicle operation that caused tire wear as well as parameters and/or characteristics associated with the behavior.

The user interface 704 of FIG. 7 is communicatively coupled, via the link(s) 710, to the output device(s) 112 to control output thereof. In particular, the user interface 704 provides control signal(s) or command(s) and/or power to the output device(s) 112, thereby generating one or more images (e.g., pop-up messages or windows, text, etc.) for viewing by the user and/or one or more sounds (e.g., a chime, speech, etc.). That is, in some examples, the user interface 704 generates, via the output device(s) 112, a notification for the person. For example, for a first one of the tires 114, 116, 118, 120, the notification indicates a first tire area (e.g., the first area 612 and/or the second area 614 of FIG. 6) that is worn (e.g., excessively worn or bald) and a second tire area (e.g., the third area 616 of FIG. 6) that is worn less (e.g., not worn) relative to the first tire area. In this manner, the tire wear determination system 700 alerts, notifies, and/or instructs the person via the output device(s) 112.

In some examples, the user interface 704 is also communicatively coupled, via the link(s) 710, to the input device(s) 110 to receive user data and/or inputs therefrom. In particular, the user interface 704 receives user data from the input device(s) 110 including one or more time stamps corresponding to when each of the tire(s) 114, 116, 118, 120 was last or most recently repaired, replaced, rotated, and/or otherwise maintained, which enables to the tire wear determination system 700 to better and/or more accurately determine the condition of the tire(s) 114, 116, 118, 120. In such examples, the tire wear determination system 700 stores the time stamp(s) in the database 708.

The network interface 705 of FIG. 7 is communicatively coupled, via the link(s) 710, to the vehicle system(s) 106 to receive at least some of the data 712, 714 therefrom. For example, the network interface 705 receives the GPS data 714 from the GPS system of the vehicle 100. In such examples, the GPS data 714 indicates one or more locations where the vehicle 100 has traveled and/or one or more roads on which the vehicle 100 traveled. Further, in another example, the network interface 705 receives at least some of the sensor data 712 and/or other appropriate data from the ABS of the vehicle 100, which indicates a number of sudden and/or excessive braking events that occurred during operation of the vehicle 100. Thus, in such examples, the data analyzer 706 determines when a driver of the vehicle 100 exhibited the second driver behavior of interest 300 based on the data provided by the ABS. Additionally, in some examples, the network interface 705 is communicatively to the other data source(s) 108 to receive the road data 716 therefrom, which indicates one or more road types (e.g., highway, streets or local roads, etc.) on which the vehicle 100 traveled and/or one or more speed limits (e.g., 25 miles per hour (MPH), 45 MPH, 60 MPH, etc.) associated with each road on which the vehicle 100 traveled.

The database 708 of FIG. 7 stores and/or provides access to at least a portion of the data 712, 714, 716, 718, 720, 722 and/or any other appropriate data associated with the vehicle 100 and/or the tire wear determination system 700. In particular, the database 708 is communicatively coupled, via the link(s) 710, to one or more of the sensor interface 702, the user interface 704, the network interface 705, and/or the data analyzer 706 to transmit and/or receive the data 712, 714, 716, 718, 720, 722. For example, the database 708 receives data from one or more of the sensor interface 702, the user interface 704, the network interface 705, and/or the data analyzer 706. Conversely, the database 708 provides data to one or more of the sensor interface 702, the user interface 704, the network interface 705, and/or the data analyzer 706.

In some examples, the database 708 receives and/or stores the criteria 718, which is pre-programmed into the controller 102 and/or provided thereto via the input device(s) 110 and/or the other data source(s) 108. In some examples, the criteria 718 is calculated and/or determined by the data analyzer 706. In particular, the criteria 718 includes one or more thresholds (e.g., values) that, when compared to particular portions of the sensor data 712 by the data analyzer 706, indicates that a driver of the vehicle 100 exhibited at least some of the driver behavior of interest 200, 300, 400, 500. Additionally or alternatively, in some examples, the criteria 718 includes one or more example data trends that, when compared particular portions of the sensor data 712 by the data analyzer 706, similarly indicates that a driver of the vehicle exhibited at least some of the driver behavior of interest 200, 300, 400, 500. In such examples, the data trends are predetermined trends of sensor data that correspond to sudden and/or excessive vehicle maneuvers. As such, when the data analyzer 706 determines that a particular portion of the sensor data 712 substantially matches a respective one of the data trends, a driver of the vehicle 100 likely exhibited a corresponding one of the behavior of interest 200, 300, 400, 500.

The data analyzer 706 of FIG. 7 particularly processes the data 712, 714, 716, 718, 720 to determine when driver(s) of the vehicle 100 exhibited at least some of the behavior of interest 200, 300, 400, 500, as discussed further below in connection with FIGS. 9-14. When determining whether a driver performed sudden and/or excessive vehicle maneuvers, the data analyzer 706 analyzes one or more parameters and/or characteristics of the sensor data 712 (and/or the GPS data 714) such as, for example, one or more of plots, plot shapes, plot trends, etc. In some examples, as previously mentioned, the data analyzer 706 compares one or more portions of the sensor data 712 to the criteria 718 to provide a determination. In response to determining that a sudden and/or excessive vehicle maneuver was performed, the data analyzer 706 generates and/or updates the determined behavior data 722 to include a portion of the sensor data 712 corresponding to the vehicle maneuver for further processing.

In some examples, after determining that a sudden and/or excessive turning event occurred during operation of the vehicle 100, the data analyzer 706 processes a corresponding portion of the sensor data 712 to determine which tire(s) 114, 116, 118, 120 generated skid mark(s) during the turning event. Further, in such examples, the data analyzer 706 uses the model(s)/equation(s) 720 to calculate, based on the corresponding portion of the sensor data 712, which tire area (e.g., one or more of the areas 612, 614, 616 of FIG. 6) was affected by the turning event. Further still, in such examples, the data analyzer 706 uses the model(s)/equation(s) 720 to calculate, based on the corresponding portion of the sensor data 712, one or more skid mark parameters resulting from the turning event. For example, in this manner, the data analyzer 706 determines one or more of: (1) a length of a skid mark; (2) a shape or geometry of the skid mark; (3) wheel speed(s) at which the skid mark was generated; (4) a speed of the vehicle 100 when the skid mark was generated; and/or (5) any other appropriate parameter associated with the skid mark. Such skid mark parameter(s) may be input to the model(s)/equation(s) 720 when calculating tread depth, which improves accuracy in the calculation.

As a result of such turning events, an outer portion (e.g., one of the outer portions 612, 616 of FIG. 6) of the affected vehicle tire is particularly worn and/or degraded. In such examples, the data analyzer 706 determines, based on the transverse acceleration, longitudinal acceleration, and/or a yaw rate of the vehicle 100, which outer area of a vehicle tire was/were affected by a turning event.

Similarly, in some examples, after determining that a sudden and/or excessive braking event occurred during operation of the vehicle 100, the data analyzer 706 processes a corresponding portion of the sensor data 712 to determine which tire(s) 114, 116, 118, 120 generated skid mark(s) during the braking event. Further, in such examples, the data analyzer 706 uses the model(s)/equation(s) 720 to calculate, based on the corresponding portion of the sensor data 712, one or more skid mark parameters resulting from the braking event. For example, in this manner, the data analyzer 706 determines one or more of: (1) a length of a skid mark; (2) a shape or geometry of the skid mark; (3) wheel speed(s) at which the skid mark was generated; (4) a speed of the vehicle 100 when the skid mark was generated; and/or (5) any other appropriate parameter associated with the skid mark. Such skid mark parameter(s) may be input to the model(s)/equation(s) 720 when calculating tread depth, which improves accuracy in the calculation.

Similarly, in some examples, after determining that a sudden and/or excessive throttling event occurred during operation of the vehicle 100, the data analyzer 706 processes a corresponding portion of the sensor data 712 to determine which tire(s) 114, 116, 118, 120 generated burnout mark(s) during the throttling event. Further, in such examples, the data analyzer 706 uses the model(s)/equation(s) 720 to calculate, based on the corresponding portion of the sensor data 712, one or more burnout mark parameters resulting from the throttling event. For example, in this manner, the data analyzer 706 determines one or more of: (1) a length of a burnout mark; (2) a shape of geometry of a burnout mark; (3) a time interval during which the burnout mark was generated; (4) wheel speed(s) at which the burnout mark was generated; and/or (5) any other appropriate parameter associated with the burnout mark. Such burnout mark parameter(s) may be input to the model(s)/equation(s) 720 when calculating tread depth, which improves accuracy in the calculation.

The data analyzer 706 of FIG. 7 also performs one or more calculations based on at least some of the data 712, 714, 716, 718, 720, 722 to determine the condition of the tire(s) 114, 116, 118, 120. For example, based on the determined driver behavior data 722, the data analyzer 706 uses the model(s)/equation(s) 720 to calculate a tread depth in one or more areas of the respective tire(s) 114, 116, 118, 120, which is discussed further below in connection with FIG. 15. In particular, the data analyzer 706 inputs one or more of the above disclosed parameters associated with the sudden and/or excessive vehicle maneuver(s) into the model(s)/equation(s) 720 to calculate the tread depth.

Additionally, in some examples, the data analyzer 706 inputs one or more other parameters into the model(s)/equation(s) 720 to calculate the tread depth such as, for example, one or more of road type(s) on which the vehicle 100 traveled, speed(s) at which the vehicle 100 traveled, distance(s) traveled by the vehicle 100, tire fluid pressure(s) of the vehicle 100, etc., as discussed in connection with FIGS. 13 and 14. In such examples, the data analyzer 706 determines, based on improper tire fluid pressure of a tire, which area(s) of the tire wore and/or degraded. For example, if the tire fluid pressure is relatively high, the data analyzer 706 determines that a central area of the tire wears and/or degrades more rapidly compared to outer areas of the tire. Conversely, if the tire fluid pressure is relatively low, the data analyzer 706 determines that the outer areas of the tire wear and/or degrade more rapidly compared to the central area.

After calculating tread depth for one or more of the tires 114, 116, 118, 120, the data analyzer 706 compares the tread depth to a threshold tread depth (e.g., a value corresponding to the threshold tread depth 610 of FIG. 6) of the criteria 718 to determine whether to notify a person. In response to determining that the tire(s) 114, 116, 118, 120 likely require maintenance, the data analyzer 706 enables the user interface 704 to control the output device(s) 112 accordingly.

The model(s)/equation(s) 720 of FIG. 7 include one or more models, one or more equations, and/or one or more algorithms or methods related to calculating a tread depth (e.g., the depth 608 of FIG. 6) in one or more areas (e.g., one or more of the areas 612, 614, 616) of a vehicle tire based on particular behavior of one or more vehicle drivers. In particular, the model(s)/equation(s) 720 define one or more relationships between the driver behavior and the tread depth. For example, the model(s)/equation(s) 720 correlate a number of sudden and/or excessive vehicle maneuvers that affected a vehicle tire to a reduction of tread depth in that tire. In another example, the model(s)/equation(s) 720 correlate a number of vehicle impacts that affected a vehicle tire to a reduction of tread depth in that tire. Further still, in another example, the model(s)/equation(s) 720 correlate one or more of vehicle speed(s), distance(s) traveled by the vehicle 100, and/or tire fluid pressure(s) to a reduction of tire tread depth.

Further, in some examples, the model(s)/equation(s) 720 correlate one or more skid mark parameters and/or one or more burnout mark parameters to a reduction of tread depth in an affected vehicle tire. In particular, the model(s)/equation(s) 720 define one or more relationships between a reduction of tread in a vehicle tire that generated a skid mark and one or more parameters of that skid mark. Similarly, in such examples, the model(s)/equation(s) 720 define one or more relationships between a reduction of tire tread wear in a vehicle tire that generated a burnout mark and one or more parameters of that burnout mark.

Although an example tire wear determination system 700 is illustrated in FIG. 7, one or more of the elements, processes, and/or devices depicted in FIG. 7 may be combined, divided, re-arranged, omitted, eliminated, and/or implemented in any other way. Further, the example tire wear determination system 700 of FIG. 7 may include one or more elements, processes, and/or devices in addition or alternatively to those illustrated in FIG. 7, and/or may include more than one of any or all of the illustrated elements, processes, and devices.

Additionally, one or more of the example elements 102, 702, 704, 705, 706, 708 and/or the example tire wear determination system 700 of FIG. 7 may be implemented by hardware, software, firmware and/or any combination of thereof. For example, any of the example element(s) 102, 702, 704, 705, 706, 708 and/or the example tire wear determination system 700 could be implemented by one or more circuits (e.g., an analog or digital circuit, a logic circuit, a programmable processor, etc.). Further, in some examples, at least one of the example element(s) 102, 702, 704, 705, 706, 708 and/or the example tire wear determination system 700 include(s) a tangible machine-readable storage device or storage disk (e.g., a memory storing the software and/or firmware).

Flow diagrams representative of example hardware logic or machine-readable instructions for implementing the example tire wear determination system 700 of FIG. 7 are shown in FIGS. 8-15. The machine-readable instructions may be a program or portion of a program for execution by a processor (e.g., the CPU 1602 (shown in FIG. 16)), which is discussed in greater detail below in connection with FIG. 16. The program may be embodied in software stored on a tangible machine-readable storage medium such as a CD-ROM, a floppy disk, a hard drive, or a memory associated with the processor. Alternatively, the entire program and/or parts thereof could be executed by a different device and/or embodied in firmware or dedicated hardware.

The example processes of FIGS. 8-16 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and to exclude propagating signals and all transmission media. Additionally or alternatively, the example methods of FIGS. 8-16 may be implemented using coded instructions stored on a non-transitory machine-readable medium in which information is stored for any duration, which includes any type of computer or machine readable storage device or disk and excludes propagating signals and transmission media.

Figure 8:
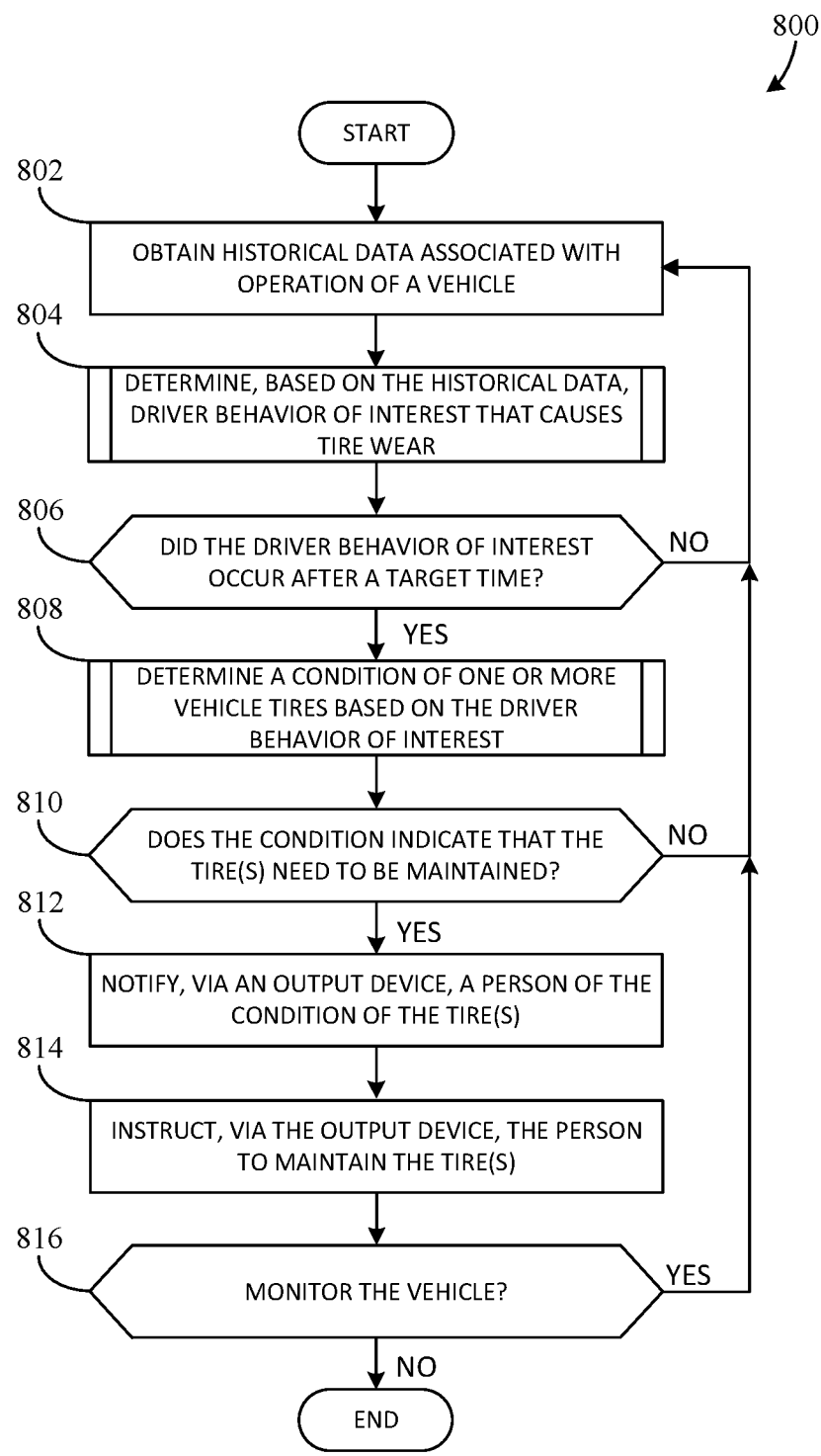
FIG. 8 is a flow diagram representative of an example method that may be executed to implement the example tire wear determination system of FIG. 7 to notify a person of a tire condition and/or instruct the person to maintain a vehicle tire.

FIG. 8 is a flow diagram representative of an example method 800 that can be executed to implement the tire wear determination system 700 of FIG. 7 to notify a person of a tire condition and/or instruct the person to maintain a vehicle tire. The example method 800 of FIG. 8 can be implemented in any of the vehicle 100 of FIGS. 1-5, the controller 102 of FIGS. 1 and 7, and/or the tire wear determination system 700 of FIG. 7.

The method 800 of FIG. 8 begins by obtaining historical data associated with operation of a vehicle (block 802). In some examples, the example tire wear determination system 700 of FIG. 7 receives or obtains at least some of the data 712, 714, 716, which is associated with historical operation of the vehicle 100. For example, the tire wear determination system 700 obtains (e.g., via the sensor interface 702 and/or the network interface 705) the sensor data 712 from the sensor(s) 104 and/or the vehicle system(s) 106. In another example, the tire wear determination system 700 obtains (e.g., via the network interface 705) the GPS data 714 and/or the road data 716. In yet another example, the tire wear determination system 700 obtains (e.g., via the user interface 704) the time stamps corresponding to when each tire 114, 116, 118, 120 was last or most recently maintained.

The method 800 of FIG. 8 also includes determining, based on the historical data, driver behavior of interest that causes tire wear (block 804). In some examples, the tire wear determination system 700 of FIG. 7 determines (e.g., via the data analyzer 706), based on at least some of the data 712, 714, 716, 718, behavior of one or more of the drivers of the vehicle 100 that causes tire wear. For example, the tire wear determination system 700 determines one or more drivers of the vehicle 100 exhibited the first driver behavior of interest 200, the second driver behavior of interest 300, the third driver behavior of interest 400, the fourth driver behavior 500 of interest, and/or any other appropriate driver behavior, as discussed below in connection with FIGS. 9-14. As previously mentioned, the tire wear determination system 700 particularly compares, analyzes, and/or otherwise processes (e.g., via the data analyzer 706) the data 712, 714, 716, 718, 720 to identify signatures and/or characteristics therein indicative of such driver behavior. In particular, one or more of the example methods 900, 1000, 1100, 1200, 1300, 1400 of FIGS. 9-14 may be executed (e.g., in parallel and/or consecutively) in connection with block 804 to implement the tire wear determination system 700 to determine whether any such driver behavior of interest 200, 300, 400, 500 (and/or other driver behavior) occurred during use of the vehicle 100 as well as one or more parameters and/or characteristics associated therewith.

In some examples, the tire wear determination system 700 determines, based on at least a portion of the data 712, 714, 716, 718, 720 whether the driver(s) repeatedly turned the vehicle 100 in a sudden and/or an excessive manner and/or one or more parameters (e.g., a number of occurrences, a duration, and/or one or more resulting skid mark parameters) associated with such vehicle turning. In some examples, the tire wear determination system 700 determines, based on at least a portion of the data 712, 714, 716, 718, 720 whether the driver(s) repeatedly applied brakes of the vehicle in an sudden and/or an excessive manner and/or one or more parameters (e.g., a number of occurrences, a duration, and/or one or more resulting skid mark parameters) associated with such vehicle braking. In some examples, the tire wear determination system 700 determines, based on at least a portion of the data 712, 714, 716, 718, 720 whether the driver(s) repeatedly applied a gas pedal or an accelerator in a sudden and/or an excessive manner and/or one or more parameters (e.g., a number of occurrences, a duration, and/or one or more resulting burnout mark parameters) associated with such vehicle throttling. In some examples, the tire wear determination system 700 determines whether at least one of the tires 114, 116, 118, 120 was repeatedly impacted during use of the vehicle 100 and/or one or more parameters (e.g., a number of occurrences, etc.) associated with the impacts.

Additionally, in some examples, the tire wear determination system 700 determines whether the vehicle 100 was operated with adverse or improper (e.g., relatively high or low) tire fluid pressure and/or one or more parameters (e.g., a fluid pressure of the affected one(s) of the tire(s) 114, 116, 118, 120 and/or distance traveled with the improper tire fluid pressure) associated with such driver behavior. Further, in some examples, the tire wear determination system 700 determines one or more road types (e.g., highway(s), street(s), etc.) on which the vehicle 100 traveled as well as a distance traveled on each road type.

The method 800 of FIG. 8 also includes determining whether the driver behavior of interest occurred after a target time (block 806). In some examples, the tire wear determination system 700 of FIG. 7 determines (e.g., via the data analyzer 706) whether the driver(s) exhibited any of the driver behavior of interest 200, 300, 400, 500 after at least one of the tire(s) 114, 116, 118, 120 was last or most recently maintained, which is indicated by the timestamp(s) obtained in connection with block 802. In such examples, if the tire wear determination system 700 determines that the driver(s) exhibited at least some of the driver behavior of interest 200, 300, 400, 500 after the target time (block 806: YES), control of the method 800 proceeds to block 808. In such examples, when determining a tire condition in connection with block 808, the tire wear determination system 700 does not consider driver behavior of the interest 200, 300, 400, 500 exhibited by the driver(s) before the target time and/or any portion of the data 712, 714, 716, 718 associated therewith. However, in some examples if the tire wear determination system 700 determines that the driver(s) exhibited none of the driver behavior of interest 200, 300, 400, 500 after the target time (block 806: NO), control of the method 800 returns to block 802.

The method 800 of FIG. 8 also includes determining a condition of one or more vehicle tires based on the driver behavior of interest (block 808). In some examples, the tire wear determination system 700 of FIG. 7 determines (e.g., via the data analyzer 706) a condition of one or more of the tire(s) 114, 116, 118, 120 of the vehicle 100 based on at least some of the driver behavior of interest 200, 300, 400, 500 determined in connection with block 804, which is discussed in greater detail below in connection with FIG. 15. In particular, for one or more (e.g., each) of the tire(s) 114, 116, 118, 120, the tire wear determination system 700 calculates one or more tread depths (e.g., the tread depth(s) 608 of FIG. 6) and/or otherwise determines one or more tire areas (e.g., the area(s) 612, 614, 616 of FIG. 6) that are worn or likely worn (e.g., excessively worn or bald). Further, in examples where none of the tires 114, 116, 118, 120 are worn, the tire wear determination system 700 calculates a rate of wear based on the driver behavior of interest 200, 300, 400, 500, which enables the tire wear determination system 700 to calculate time (e.g., days, weeks, months, etc.) when the one or more of the tire(s) 114, 116, 118, 120 will likely be worn.

The method 800 of FIG. 8 also includes determining whether the condition indicates that the tire(s) need to be maintained (block 810). In some examples, the tire wear determination system 700 of FIG. 7 determines (e.g., via the data analyzer 706) whether the condition of the tire(s) 114, 116, 118, 120 identified in connection with block 808 indicates that one or more of the tire(s) 114, 116, 118, 120 need to be repaired, rotated, replaced, and/or otherwise maintained. For example, the tire wear determination system 700 compares one or more of the calculated tread depth(s) to the criteria 718 (e.g., the threshold tread depth 610) to make such a determination. In such examples, if the tire wear determination system 700 makes a positive determination (e.g., at least some of the tread depths 608 are at or below the threshold tread depth 610) (block 810: YES), control of the method 800 proceeds to block 812. However, if the tire wear determination system 700 makes a negative determination (e.g., none of the tread depths 608 is below the threshold tread depth 610) (block 810. NO), control of the method 800 returns to block 802.

The method 800 of FIG. 8 also includes notifying, via an output device, a person of the condition of the tire(s) (block 812). In some examples, the tire wear determination system 700 of FIG. 7 controls (e.g., via the user interface 704) the output device(s) 112, thereby notifying (e.g., via a pop-up message or window, text, a chime, speech, etc.) one or more persons or users (e.g., one or more drivers of the vehicle 100, vehicle servicer personnel, etc.) of the condition of the tire(s) 114, 116, 118, 120 determined in connection with block 808. That is, in some examples, the tire wear determination system 700 generates, via the output device(s) 112, a notification for the person(s). For example, for a first one of the tires 114, 116, 118, 120, the notification indicates a first tire area (e.g., the first area 612 and/or the second area 614 of FIG. 6) that is worn (e.g., excessively worn or bald) and a second tire area (e.g., the third area 616 of FIG. 6) that is worn less (e.g., not worn) relative to the first tire area.

The method 800 of FIG. 8 also includes instructing, via the output device, the person to maintain the tire(s) (block 814). In some examples, the tire wear determination system 700 of FIG. 7 controls (e.g., via the user interface 704) the output device(s) 112, thereby instructing (e.g., via a pop-up message or window, text, a chime, speech, etc.) the person(s) to repair, rotate, replace, and/or otherwise maintain the worn tire(s) 114, 116, 118, 120.

The method 800 of FIG. 8 also includes determining whether to monitor the vehicle (block 816). In some examples, the tire wear determination system 700 of FIG. 7 determines (e.g., via the data analyzer 706) whether to monitor the vehicle 100. In such examples, if the tire wear determination system 700 determines to monitor the vehicle 100 (e.g., the vehicle 100 is in operation) (block 816: YES), control of the method 800 returns to block 802. However, if the tire wear determination system 700 determines not to monitor the vehicle 100 (e.g., the vehicle is not in operation) (block 816: NO), the method 800 ends.

Although the example method 800 is described in connection with the flow diagram of FIG. 8, one or more other methods of implementing the example tire wear determination system 700 may alternatively be used. For example, the order of execution of the blocks 802, 804, 806, 808, 810, 812, 814, 816 may be changed, and/or at least some operations of the blocks 802, 804, 806, 808, 810, 812, 814, 816 described may be changed, eliminated, or combined.

Figure 9:
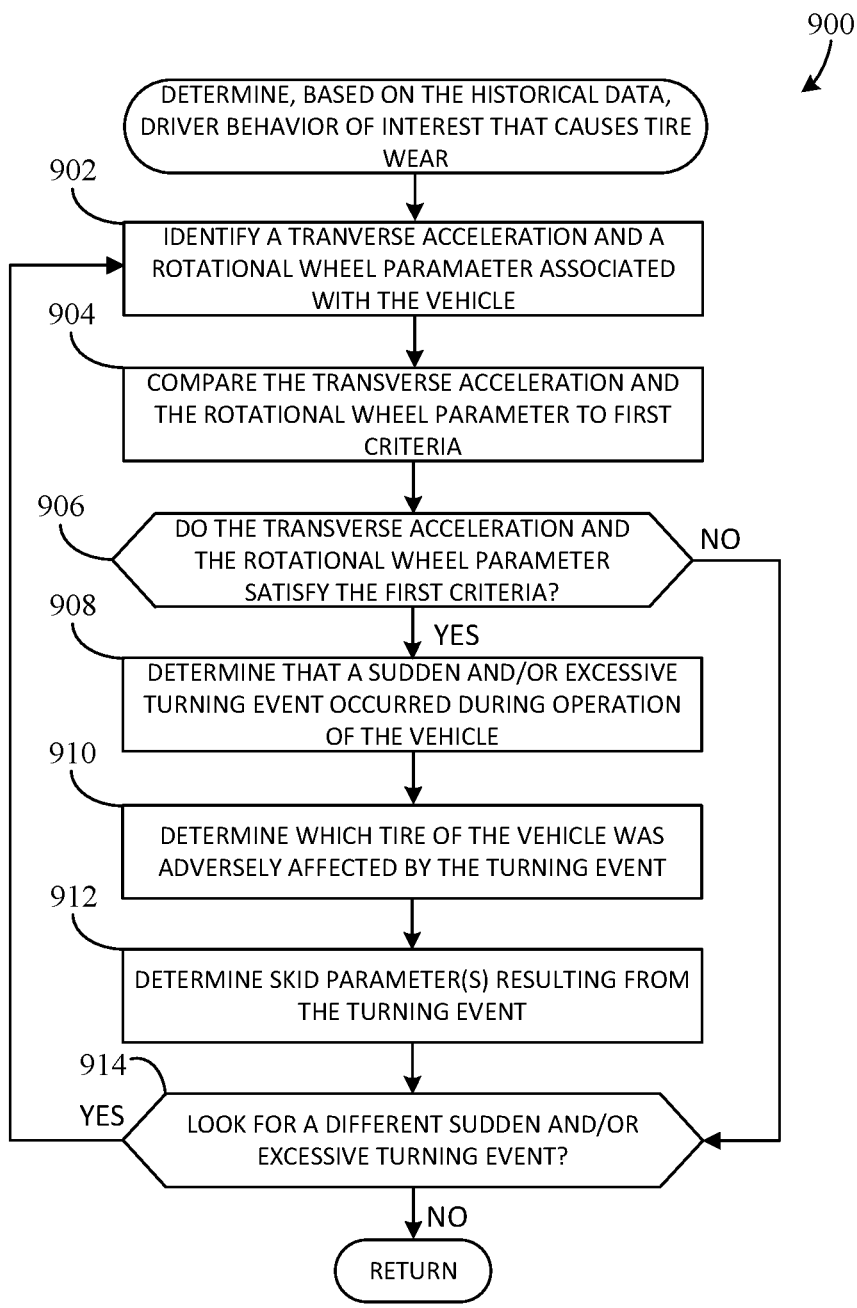
FIGS. 9-14 are flow diagrams representative of example methods that may be executed to implement the example tire wear determination system of FIG. 7 to determine driver behavior of interest that causes tire wear.

FIG. 9 is a flow diagram representative of an example method 900 that may be executed to implement the example tire wear determination system 700 of FIG. 7 to determine driver behavior of interest that causes tire wear. The example method 900 of FIG. 9 can be implemented in any of the vehicle 100 of FIGS. 1-5, the controller 102 of FIGS. 1 and 7, and/or the tire wear determination system 700 of FIG. 7. Example operations of blocks 902, 904, 906, 908, 910, 912, 914, may be used to implement block 804 of FIG. 8. In particular, the example method 900 of FIG. 9 is effective in determining whether the driver(s) of the vehicle 100 exhibited the first driver behavior of interest 200 while operating the vehicle 100 as well as one or more parameters and/or characteristics associated with such behavior.

The method 900 of FIG. 9 begins by identifying a transverse acceleration and a rotational wheel parameter associated with the vehicle (block 902). In some examples, the tire wear determination system 700 of FIG. 7 identifies (e.g., via the data analyzer 706), based on at least a portion of the data 712, 714, a transverse acceleration and a rotational wheel parameter (e.g., a wheel speed) associated with the vehicle 100. Such operational parameters of the vehicle 100 are indicative of the first driver behavior of interest 200.

The method 900 of FIG. 9 also includes comparing the transverse acceleration and the rotational wheel parameter to first criteria (block 904). In some examples, the tire wear determination system 700 of FIG. 7 compares (e.g., via the data analyzer 706) the transverse acceleration (identified in connection with block 902) to a first example threshold (e.g., a value corresponding to a threshold transverse acceleration) of the criteria 718. Further, in such examples, the tire wear determination system 700 also compares the rotational wheel parameter (identified in connection with block 902) to a second example threshold (e.g., a value corresponding to a threshold rotational wheel parameter) of the criteria 718. Additionally or alternatively, in some examples, the tire wear determination system 700 compares a trend of the transverse acceleration and the rotational wheel parameter to a first example data trend (e.g., a predetermined trend of transverse acceleration and wheel speed corresponding to a sudden and/or excessive vehicle turning event) of the criteria 718. Such comparison(s) indicate to the tire wear determination system 700 whether the driver(s) exhibited the first driver behavior of interest 200.

The method 900 of FIG. 9 also includes determining whether the transverse acceleration and the rotational wheel parameter satisfy the first criteria (block 906). In some examples, the tire wear determination system 700 of FIG. 7 determines (e.g., via the data analyzer 706), based on the comparison performed in connection with block 904, whether the transverse acceleration is above or below the first threshold hold and the rotational wheel parameter is above or below the second threshold. In such examples, the first criteria are considered to be satisfied if the transverse acceleration is above the first threshold and the rotational wheel parameter is above the second threshold. Additionally or alternatively, in some examples, the tire wear determination system 700 determines, based on the comparison performed in connection with block 904, whether the trend of the transverse acceleration and the rotational wheel parameter substantially matches the first data trend. In such examples, the first criteria are considered to be satisfied if the transverse acceleration and the rotational wheel parameter substantially match the first data trend.

In some examples, if the tire wear determination system 700 determines that none of the first criteria is satisfied (block 906: NO), control of the method 900 proceeds to block 914. However, if the tire wear determination system 700 determines that the first criteria are satisfied (block 906: YES), control of the method 900 proceeds to block 908.

The method 900 of FIG. 9 also includes determining that a sudden and/or excessive turning event occurred during operation of the vehicle (block 908). In some examples, the tire wear determination system 700 of FIG. 7 determines (e.g., via the data analyzer 706) that a sudden and/or excessive turning event occurred during operation of the vehicle 100 (e.g., a driver of the vehicle 100 exhibited the first example driver behavior of interest 200). In such examples, the tire wear determination system 700 generates and/or updates the determined behavior data 722 to include one or more of: (1) the determined turning event; (2) a time at which the turning event occurred; (3) a duration (e.g., a time interval) of the turning event; (4) and/or a portion (e.g., the transverse acceleration, the rotational wheel parameter, a yaw rate of the vehicle 100, related time stamp(s), etc.) of the sensor data 712 corresponding to the turning event.

The method 900 of FIG. 9 also includes determining which tire of the vehicle was adversely affected by the turning event (block 910). In some examples, the tire wear determination system 700 of FIG. 7 determines (e.g., via the data analyzer 706), based on the determined behavior data 722, which one(s) of the tire(s) 114, 116, 118, 120 of the vehicle 100 was/were adversely affected by the turning event determined in connection with block 908. For example, the tire wear determination system 700 determines that the third tire 118 was adversely affected by the turning event depicted in FIG. 2 due to the vehicle 100 turning in the direction 204. Further, in this example, the tire wear determination system 700 determines that tread of an outer area (e.g., one of the areas 612, 614 of FIG. 6) of the third tire 118 was worn and/or degraded as a result of this turning event.

The method 900 of FIG. 9 also includes determining skid parameter(s) resulting from the turning event (block 912). In some examples, the tire wear determination system 700 of FIG. 7 determines (e.g., via the data analyzer 706), based on the data 720, 722, one or more skid parameters resulting from the turning event in connection with block 908. For example, the tire wear determination system 700 uses the model(s)/equation(s) 720 to determine, based on the transverse acceleration and the rotational wheel parameter, the length 206 of the first skid mark 202, the shape or geometry of the first skid mark 202, and/or a time interval during which the first skid mark was generated by the third tire 118.

The method 900 of FIG. 9 also includes determining whether to look for a different sudden and/or excessive turning event (block 914). In some examples, the tire wear determination system 700 of FIG. 7 determines (e.g., via the data analyzer 706) whether to look, based on a different portion of the data 712, 714, for a different sudden and/or excessive turning event that occurred during operation of the vehicle 100. In some examples, if the tire wear determination system 700 provides a positive determination (e.g., when one or more sudden and/or excessive turning events likely exist that have not yet been identified and/or accounted for) (block 914: YES), control of the method 900 returns to block 902. In this manner, the tire wear determination system 700 determines multiple (e.g., all) sudden and/or excessive turning events performed by the driver(s) of the vehicle 100 based on the comparison(s) performed in connection with block 904. In such examples, the tire wear determination system 700 generates and/or updates the determined behavior data 722 to include a number (e.g., a total) of the turning events that occurred as well as the other associated parameter(s) and/or characteristic(s). However, if the tire wear determination system 700 provides a negative determination (e.g., when all sudden and/or excessive turning events have likely been identified and/or accounted for) (block 914: NO), control of the method 900 returns to a calling function such as the method 800 of FIG. 8 or proceeds to one of the other example methods 1000, 1100, 1200, 1300, 1400.

Although the example method 900 is described in connection with the flow diagram of FIG. 9, one or more other methods of implementing the example tire wear determination system 700 may alternatively be used. For example, the order of execution of the blocks 902, 904, 906, 908, 910, 912, 914 may be changed, and/or at least some operations of the blocks 902, 904, 906, 908, 910, 912, 914 described may be changed, eliminated, or combined.

Figure 10:
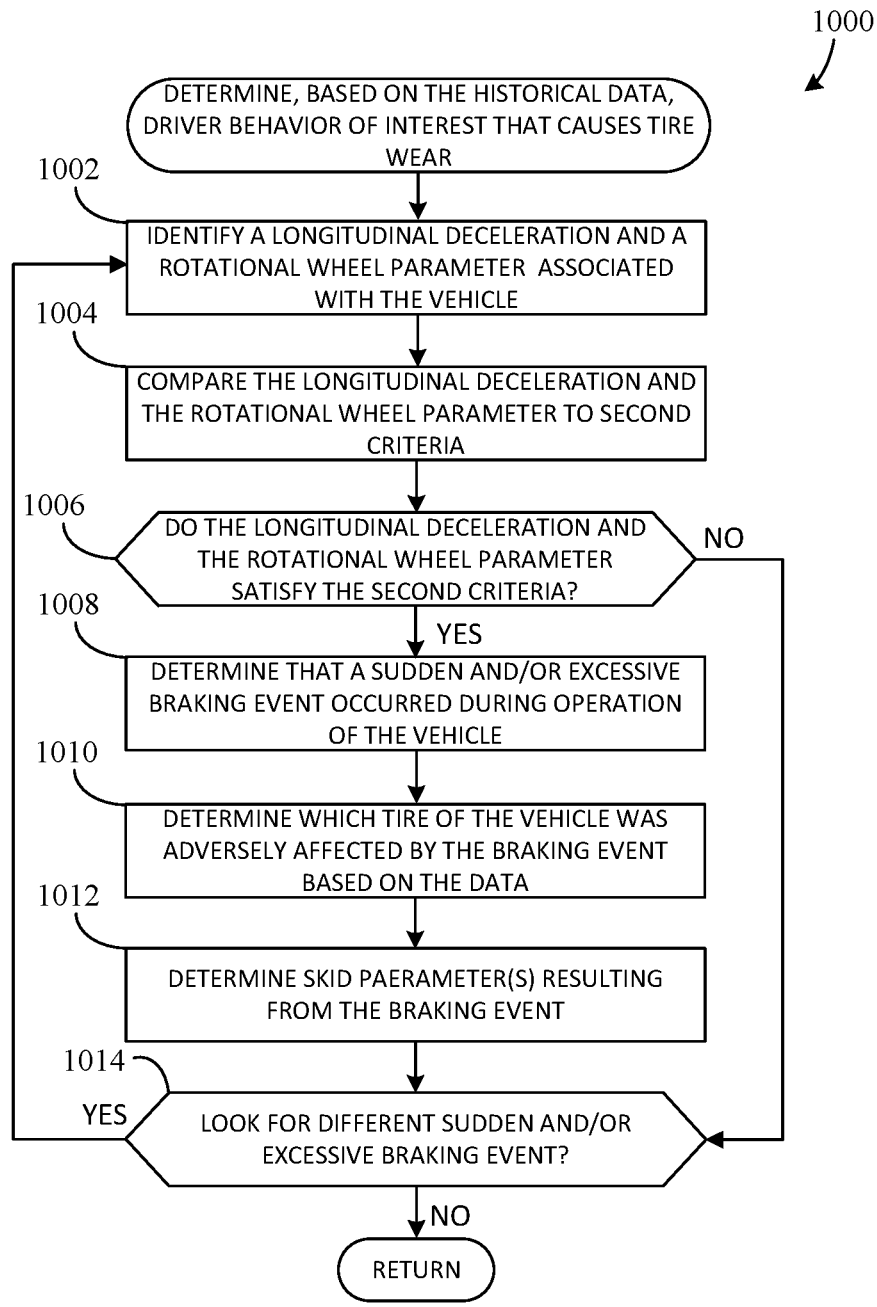

FIG. 10 is a flow diagram representative of another example method 1000 that may be executed to implement the example tire wear determination system 700 of FIG. 7 to determine driver behavior of interest that causes tire wear. The example method 1000 of FIG. 10 can be implemented in any of the vehicle 100 of FIGS. 1-5, the controller 102 of FIGS. 1 and 7, and/or the tire wear determination system 700 of FIG. 7. Example operations of blocks 1002, 1004, 1006, 1008, 1010, 1012, 1014 may be used to implement block 804 of FIG. 8. In particular, the example method 1000 of FIG. 10 is effective in determining whether the driver(s) exhibited the second driver behavior of interest 300 while operating the vehicle 100 as well as one or more parameters and/or characteristics associated with such driver behavior.

The method 1000 of FIG. 10 begins by identifying a longitudinal deceleration and a rotational wheel parameter associated with the vehicle (block 1002). In some examples, the tire wear determination system 700 of FIG. 7 identifies (e.g., via the data analyzer 706), based on at least a portion of the data 712, 714, a longitudinal deceleration and a rotational wheel parameter (e.g., a wheel speed) associated with the vehicle 100. Such operational parameters of the vehicle 100 are indicative of the second driver behavior of interest 300.

The method 1000 of FIG. 10 also includes comparing the longitudinal deceleration and the rotational wheel parameter to second criteria (block 1004). In some examples, the tire wear determination system 700 of FIG. 7 compares (e.g., via the data analyzer 706) the longitudinal deceleration (identified in connection with block 1002) to a third example threshold (e.g., a value corresponding to a longitudinal deceleration) of the criteria 718. Further, in such examples, the tire wear determination system 700 also compares the rotational wheel parameter (identified in connection with block 1002) to a fourth example threshold (e.g., a value corresponding to a threshold rotational wheel parameter) of the criteria 718. Additionally or alternatively, in some examples, the tire wear determination system 700 compares a trend of the longitudinal deceleration and the rotational wheel parameter to a second example data trend (e.g., a predetermined trend of longitudinal deceleration and a wheel speed corresponding to a sudden and/or excessive braking event) of the criteria 718. Such example comparison(s) indicate to the tire wear determination system 700 whether the driver(s) exhibited the second driver behavior of interest 300.

The method 1000 of FIG. 10 also includes determining whether the longitudinal deceleration and the rotational wheel parameter satisfy the second criteria (block 1006). In some examples, the tire wear determination system 700 of FIG. 7 determines (e.g., via the data analyzer 706), based on the comparison performed in connection with block 1004, whether the longitudinal deceleration is above or below the third threshold and the rotational wheel parameter is above or below the fourth threshold. In such examples, the second criteria are considered to be satisfied if the deceleration is above the third threshold and the rotational wheel parameter is below the fourth threshold. Additionally or alternatively, in some examples, the tire wear determination system 700 determines, based on the comparison performed in connection with block 1004, whether the trend of longitudinal deceleration and the rotational wheel parameter substantially matches the second data trend. In such examples, the first criteria are considered to be satisfied if the transverse acceleration and the rotational wheel parameter substantially match the second data trend.

In some examples, if the tire wear determination system 700 determines that none of the second criteria is satisfied (block 1006: NO), control of the method 1000 proceeds to block 1014. However, if the tire wear determination system 700 determines that the second criteria are satisfied (block 1006: YES), control of the method 1000 proceeds to block 1008.

The method 1000 of FIG. 10 also includes determining that a sudden and/or excessive braking event occurred during operation of the vehicle (block 1008). In some examples, the tire wear determination system 700 of FIG. 7 determines (e.g., via the data analyzer 706) that a sudden and/or excessive braking event occurred during operation of the vehicle 100 (e.g., a driver of the vehicle 100 exhibited the second example driver behavior of interest 300). In such examples, the tire wear determination system 700 generates and/or updates the determined behavior data 722 to include one or more of: (1) the determined braking event; (2) a time at which the braking event occurred; (3) a duration (e.g., a time interval) of the braking event; (4) and/or a portion (e.g., the longitudinal deceleration, the rotational wheel parameter, related time stamp(s), etc.) of the sensor data 712 corresponding to the braking event.

The method 1000 of FIG. 10 also includes determining which tire of the vehicle was adversely affected by the braking event (block 1010). In some examples, the tire wear determination system 700 of FIG. 7 determines (e.g., via the data analyzer 706), based on the determined behavior data 722, which one(s) of the tire(s) 114, 116, 118, 120 of the vehicle 100 was/were adversely affected by the braking event determined in connection with block 1008. For example, the tire wear determination system 700 determines that all of the tires 114, 116, 118, 120 were adversely affected by the braking event depicted in FIG. 3 due to each wheel of the vehicle 100 locking-up and/or slipping during the braking event. Further, in this example, the tire wear determination system 700 determines that all areas (e.g., the first, second, and third areas 612, 614, 616) of tread of the respective tires 114, 116, 118, 120 were worn and/or degraded by this braking event.

The method 1000 of FIG. 10 also includes determining skid parameter(s) resulting from the braking event (block 1012). In some examples, the tire wear determination system 700 of FIG. 7 determines (e.g., via the data analyzer 706), based on the data 720, 722, one or more skid parameters resulting from the braking event determined in connection with block 1008. For example, the tire wear determination system 700 uses the model(s)/equation(s) 720 to determine, based on the longitudinal acceleration, the rotational wheel parameter, and/or the brake fluid pressure of the vehicle 100, the length(s) 310, 312, 314 of the skid marks 302, 304 and/or a time interval during which each skid mark 302, 304 was generated.

The method 1000 of FIG. 10 also includes determining whether to look for a different sudden and/or excessive braking event (block 1014). In some examples, the tire wear determination system 700 of FIG. 7 determines (e.g., via the data analyzer 706) whether to look, based on a different portion of the sensor data 712, 714, for a different sudden and/or excessive braking event that occurred during operation of the vehicle 100. In some examples, if the tire wear determination system 700 provides a positive determination (e.g., when one or more sudden and/or excessive braking events likely exist that have not yet been identified and/or accounted for) (block 1014: YES), control of the method 1000 returns to block 1002. In this manner, the tire wear determination system 700 determines multiple (e.g., all) sudden and/or excessive braking events performed by the driver(s) of the vehicle 100 based on the comparison(s) performed in connection with block 1004. In such examples, the tire wear determination system 700 generates and/or updates the determined behavior data 722 to include a number (e.g., a total) of the braking events that occurred as well as the other associated parameter(s) and/or characteristics. However, if the tire wear determination system 700 provides a negative determination (e.g., when all sudden and/or excessive braking events have likely been identified and/or accounted for) (block 1014: NO), control of the method 1000 returns to a calling function such as the method 800 of FIG. 8 or proceeds to one of the other example methods 900, 1100, 1200, 1300, 1400.

Although the example method 1000 is described in connection with the flow diagram of FIG. 10, one or more other methods of implementing the example tire wear determination system 700 may alternatively be used. For example, the order of execution of the blocks 1002, 1004, 1006, 1008, 1010, 1012, 1014 may be changed, and/or at least some operations of the blocks 1002, 1004, 1006, 1008, 1010, 1012, 1014 described may be changed, eliminated, or combined.

Figure 11:
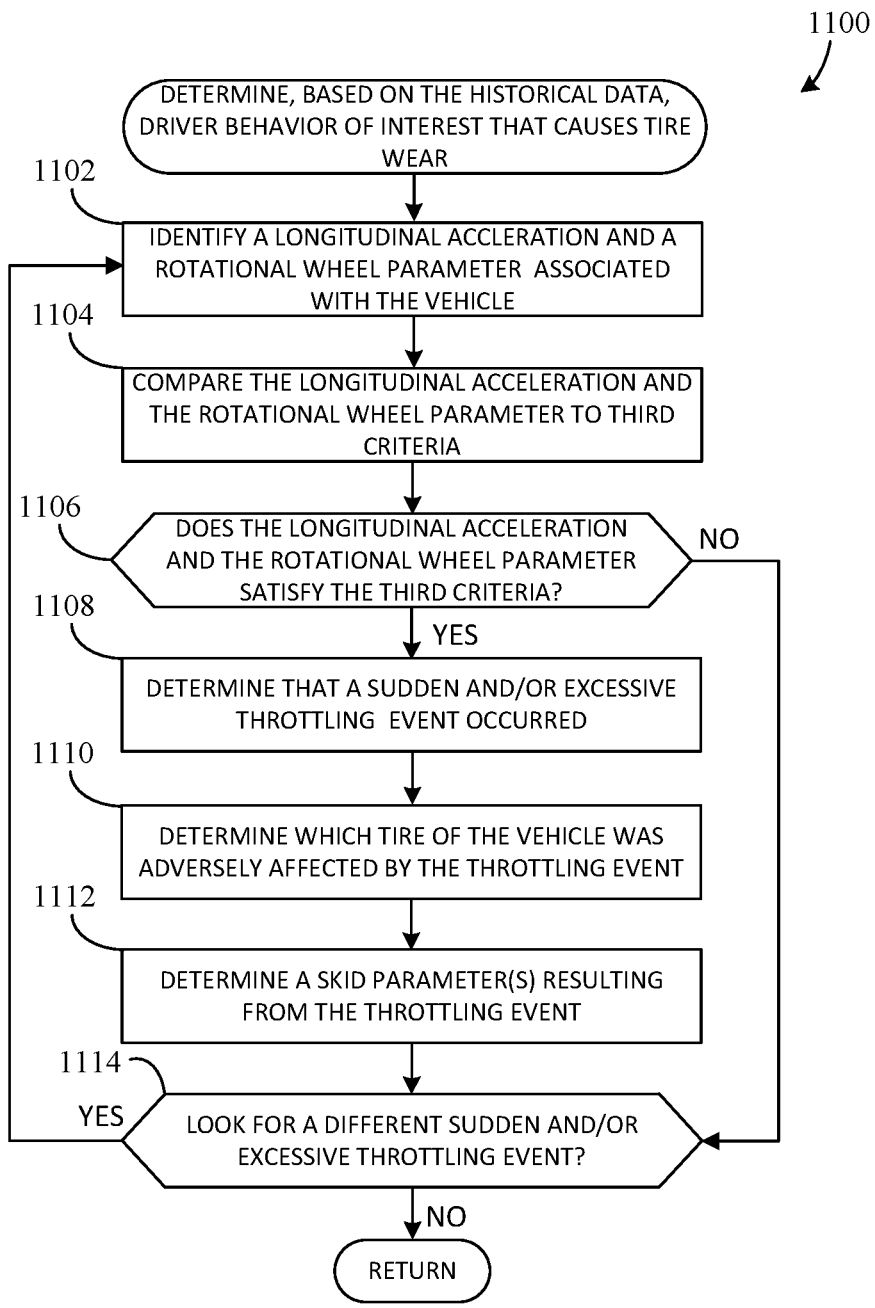

FIG. 11 is a flow diagram representative of another example method 1100 that may be executed to implement the example tire wear determination system 700 of FIG. 7 to determine driver behavior of interest that causes tire wear. The example method 1100 of FIG. 11 can be implemented in any of the vehicle 100 of FIGS. 1-5, the controller 102 of FIGS. 1 and 7, and/or the tire wear determination system 700 of FIG. 7. Example operations of blocks 1102, 1104, 1106, 1108, 1110, 1112, 1114 may be used to implement block 804 of FIG. 8. In particular, the example method 1100 of FIG. 11 is effective in determining whether the driver(s) exhibited the third driver behavior of interest 400 while operating the vehicle 100 as well as one or more parameters and/or characteristics associated with such driver behavior.

The method 1100 of FIG. 11 begins by identifying a longitudinal acceleration and a rotational wheel parameter associated with the vehicle (block 1102). In some examples, the tire wear determination system 700 of FIG. 7 identifies (e.g., via the data analyzer 706), based on at least a portion of the data 712, 714, a longitudinal acceleration and a rotational wheel parameter (e.g., a wheel speed) associated with the vehicle 100. Such operational parameters of the vehicle 100 are indicative of the third driver behavior of interest 400.

The method 1100 of FIG. 11 also includes comparing the longitudinal acceleration and the rotational wheel parameter to third criteria (block 1104). In some examples, the tire wear determination system 700 of FIG. 7 compares (e.g., via the data analyzer 706) the longitudinal acceleration (identified in connection with block 1102) to a fifth example threshold (e.g., a value corresponding to a longitudinal acceleration) of the criteria 718. Further, in such examples, the tire wear determination system 700 compares the rotational wheel parameter (identified in connection with block 1102) to a sixth example threshold (e.g., a value corresponding to a threshold rotational wheel parameter) of the criteria 718. Additionally or alternatively, in some examples, the tire wear determination system 700 compares a trend of the longitudinal acceleration and the rotational wheel parameter to a third example data trend (e.g., a predetermined trend of longitudinal acceleration and wheel speed corresponding to a sudden and/or excessive vehicle throttling event) of the criteria 718. Such example comparison(s) indicate to the tire wear determination system 700 whether the driver(s) exhibited the third driver behavior of interest 400.

The method 1100 of FIG. 11 also includes determining whether the longitudinal acceleration and the rotational wheel parameter satisfy the third criteria (block 1106). In some examples, the tire wear determination system 700 of FIG. 7 determines (e.g., via the data analyzer 706), based on the comparison performed in connection with block 1104, whether the longitudinal acceleration is above or below the fifth threshold and the rotational wheel parameter is above or below the sixth threshold. In such examples, the third criteria are considered to be satisfied if the longitudinal acceleration is above the fifth threshold and the rotational wheel parameter is above the sixth threshold. Additionally or alternatively, in some examples, the tire wear determination system 700 determines, based on the comparison performed in connection with block 1104, whether the trend of the longitudinal acceleration and the rotational wheel parameter substantially matches the third data trend. In such examples, the third criteria are considered to be at least partially satisfied if the longitudinal acceleration and the rotational wheel parameter substantially match the third data trend.

In some examples, if the tire wear determination system 700 determines that none of the third criteria is satisfied (block 1106: NO), control of the method 1100 proceeds to block 1114. However, if the tire wear determination system 700 determines that the third criteria are satisfied (block 1106: YES), control of the method 1100 proceeds to block 1108.

The method 1100 of FIG. 11 also includes determining that a sudden and/or excessive throttling event occurred during operation of the vehicle (block 1108). In some examples, the tire wear determination system 700 of FIG. 7 determines (e.g., via the data analyzer 706) that a sudden and/or excessive throttling event occurred during operation of the vehicle 100 (e.g., a driver of the vehicle 100 exhibited the third example driver behavior of interest 400). In such examples, the tire wear determination system 700 generates and/or updates the determined behavior data 722 to include one or more of: (1) the determined throttling event; (2) a time at which the throttling event occurred; (3) a duration (e.g., a time interval) of the throttling event; (4) and/or a portion (e.g., the longitudinal acceleration, the rotational wheel parameter, related time stamp(s), etc.) of the sensor data 712 corresponding to the throttling event.

The method 1100 of FIG. 11 also includes determining which tire of the vehicle was adversely affected by the throttling event (block 1110). In some examples, the tire wear determination system 700 of FIG. 7 determines (e.g., via the data analyzer 706), based on the determined behavior data 722, which one(s) of the tire(s) 114, 116, 118, 120 of the vehicle 100 was/were adversely affected by the throttling event determined in connection with block 1108. For example, the tire wear determination system 700 determines that only the third and fourth tires 118, 120 were adversely affected by the throttling event depicted in FIG. 4 due to corresponding vehicle wheels (e.g., rear wheels) of the vehicle 100 spinning and/or slipping during the throttling event.

The method 1100 of FIG. 11 also includes determining skid parameter(s) resulting from the throttling event (block 1112). In some examples, the tire wear determination system 700 of FIG. 7 determines (e.g., via the data analyzer 706), based on the data 720, 722, one or more skid parameters resulting from the throttling event determined in connection with block 1108. For example, the tire wear determination system 700 uses the model(s)/equation(s) 720 to determine, based on the longitudinal acceleration and the rotational wheel parameter, the length(s) 406, 408 of the burnout marks 402, 404 and/or a time interval during which the burnout mark(s) 402, 402 where generated.

The method 1100 of FIG. 11 also includes determining whether to look for a different sudden and/or excessive throttling event (block 1114). In some examples, the tire wear determination system 700 of FIG. 7 determines (e.g., via the data analyzer 706) whether to look, based on a different portion of the data 712, 714, for a different sudden and/or excessive throttling event that occurred during operation of the vehicle 100. In some examples, if the tire wear determination system 700 provides a positive determination (e.g., when one or more sudden and/or excessive throttling events likely exist that have not yet been identified and/or accounted for) (block 1114: YES), control of the method 1100 returns to block 1102. In this manner, the tire wear determination system 700 determines multiple (e.g., all) sudden and/or excessive throttling events performed by the driver(s) of the vehicle 100 based on the comparison(s) performed in connection with block 1104. In such examples, the tire wear determination system 700 generates and/or updates the determined behavior data 722 to include a number (e.g., a total) of the throttling events that occurred as well as the other associated parameter(s) and/or characteristic(s). However, if the tire wear determination system 700 provides a negative determination (e.g., when all sudden and/or excessive throttling events have likely been identified and/or accounted for) (block 1114: NO), control of the method 1100 returns to a calling function such as the method 800 of FIG. 8 or proceeds to one of the other example methods 900, 1000, 1200, 1300, 1400.

Although the example method 1100 is described in connection with the flow diagram of FIG. 11, one or more other methods of implementing the example tire wear determination system 700 may alternatively be used. For example, the order of execution of the blocks 1102, 1104, 1106, 1108, 1110, 1112, 1114 may be changed, and/or at least some operations of the blocks 1102, 1104, 1106, 1108, 1110, 1112, 1114 described may be changed, eliminated, or combined.

Figure 12:
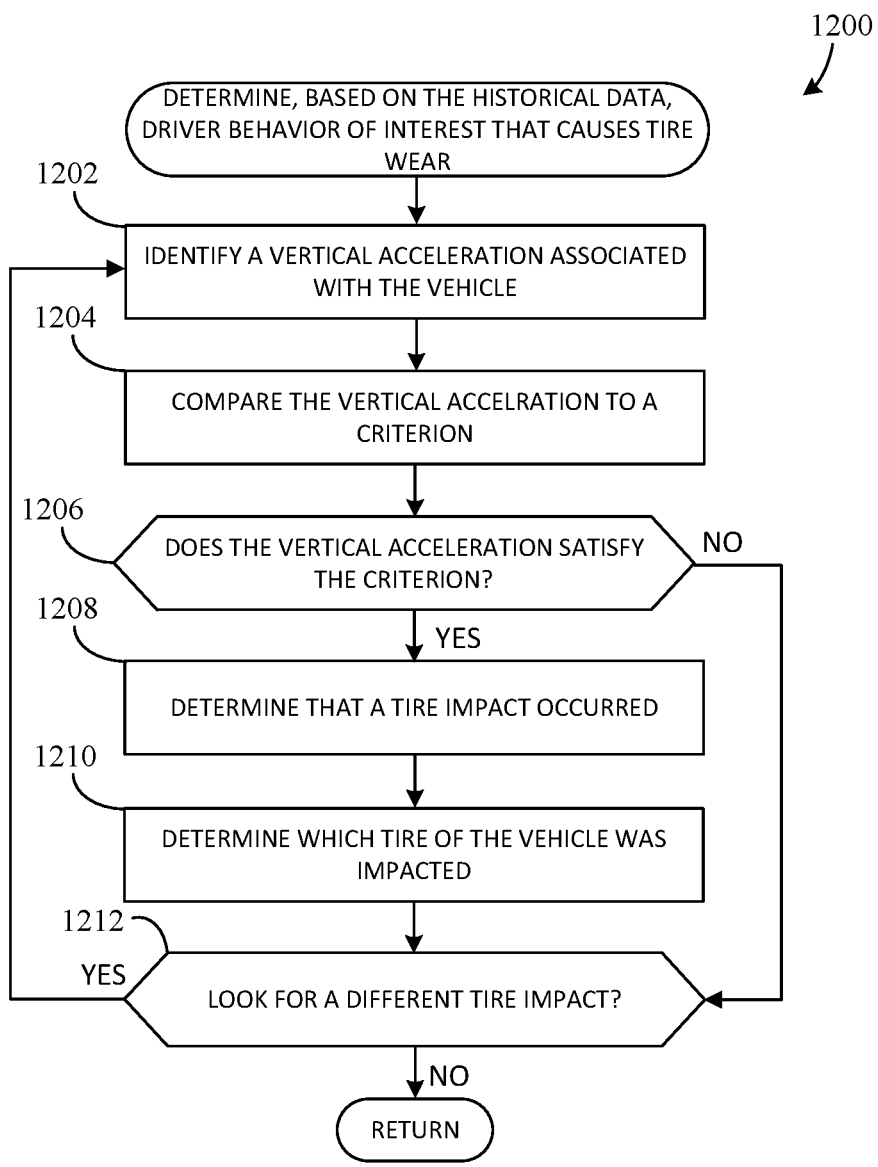

FIG. 12 is a flow diagram representative of another example method 1200 that may be executed to implement the example tire wear determination system 700 of FIG. 7 to determine driver behavior of interest that causes tire wear. The example method 1200 of FIG. 12 can be implemented in any of the vehicle 100 of FIGS. 1-5, the controller 102 of FIGS. 1 and 7, and/or the tire wear determination system 700 of FIG. 7. Example operations of blocks 1202, 1206, 1204, 1208, 1210, 1212 may be used to implement block 804 of FIG. 8. In particular, the example method 1200 of FIG. 12 is effective in determining whether the driver(s) exhibited the fourth driver behavior of interest 500 while operating the vehicle 100 as well as one or more parameters and/or characteristics associated with such driver behavior.

The method 1200 of FIG. 12 begins by identifying a vertical acceleration associated with the vehicle (block 1202). In some examples, the tire wear determination system 700 of FIG. 7 identifies (e.g., via the data analyzer 706), based on at least a portion of the sensor data 712, a vertical acceleration associated with the vehicle 100, which is indicative of the fourth driver behavior of interest 500.

The method 1200 of FIG. 12 also includes comparing the vertical acceleration to a criterion (block 1206). In some examples, the tire wear determination system 700 of FIG. 7 compares (e.g., via the data analyzer 706) the vertical acceleration identified in connection with block 1202 to a seventh example threshold (e.g., a value corresponding to a vertical acceleration) of the criteria 718. Additionally or alternatively, in some examples, the tire wear determination system 700 compares a trend of the vertical acceleration to a fourth example data trend (e.g., a predetermined trend of vertical acceleration corresponding to a tire impact) of the criteria 718. Such example comparison(s) indicate to the tire wear determination system 700 whether the driver(s) exhibited the fourth driver behavior of interest 500.

The method 1200 of FIG. 12 also includes determining whether the vertical acceleration satisfies the criterion (block 1204). In some examples, the tire wear determination system 700 of FIG. 7 determines (e.g., via the data analyzer 706), based on the comparison performed in connection with block 1206, whether the vertical acceleration is above or below the seventh threshold. In such examples, the criterion is considered to be satisfied if the vertical acceleration is above the seventh threshold. Additionally or alternatively, in some examples, the tire wear determination system 700 determines, based on the comparison performed in connection with block 904, whether the trend of transverse acceleration and the rotational wheel parameter substantially matches the fourth data trend. In such examples, the criterion is considered to be satisfied if the transverse acceleration and the rotational wheel parameter substantially matches the fourth data trend.

In some examples, if the tire wear determination system 700 determines that the criterion is not satisfied (block 1204: NO), control of the method 1200 proceeds to block 1212. However, if the tire wear determination system 700 determines that the criterion is satisfied (block 1204: YES), control of the method 1200 proceeds to block 1208.

The method 1200 of FIG. 12 also includes determining that a tire impact occurred during operation of the vehicle (block 1208). In some examples, the tire wear determination system 700 of FIG. 7 determines (e.g., via the data analyzer 706) that a tire impact occurred during operation of the vehicle 100 (e.g., a driver of the vehicle 100 exhibited the fourth example driver behavior 500). In such examples, the tire wear determination system 700 generates and/or updates the determined behavior data 722 to include one or more of: (1) the determined tire impact; (2) a time at which the tire impact occurred; (3) and/or a portion (e.g., the vertical acceleration, rotational wheel parameters of respective ones of the tires 114, 116, 118, 120, related time stamp(s), etc.) of the sensor data 712 corresponding to the tire impact.

The method 1200 of FIG. 12 also includes determining which tire of the vehicle was impacted (block 1210). In some examples, the tire wear determination system 700 of FIG. 7 determines (e.g., via the data analyzer 706), based on the determined behavior data 722, which one(s) of the tire(s) 114, 116, 118, 120 of the vehicle 100 was/were adversely affected by the impact determined in connection with block 1208. For example, the tire wear determination system 700 determines, based on rotational parameters of respective ones of the tires 114, 116, 118, 120, that the first tire 114 engaged the protrusion 502 and/or the recessed area 504 and/or was otherwise adversely affected by the driving surface feature(s) 502, 504.

The method 1200 of FIG. 12 also includes determining whether to look for a different tire impact (block 1212). In some examples, the tire wear determination system 700 of FIG. 7 determines (e.g., via the data analyzer 706) whether to look, based on a different portion of the data 712, 714, for a different tire impact that occurred during operation of the vehicle 100. In some examples, if the tire wear determination system 700 provides a positive determination (e.g., when one or more tire impacts likely exist that have not yet been identified and/or accounted for) (block 1212: YES), control of the method 1200 returns to block 1202. In this manner, the tire wear determination system 700 determines multiple (e.g., all) tire impacts encountered by the vehicle 100 based on the comparison(s) performed in connection with block 1206. In such examples, the tire wear determination system 700 generates and/or updates the determined behavior data 722 to include a number (e.g., a total) of the tire impacts that occurred and/or a severity of each impact. However, if the tire wear determination system 700 provides a negative determination (e.g., when all tire impacts have been identified and/or accounted for) (block 1212: NO), control of the method 1200 returns to a calling function such as the method 800 of FIG. 8 or proceeds to one of the other example methods 900, 1000, 1100, 1300, 1400.

Although the example method 1200 is described in connection with the flow diagram of FIG. 12, one or more other methods of implementing the example tire wear determination system 700 may alternatively be used. For example, the order of execution of the blocks 1202, 1206, 1204, 1208, 1210, 1212 may be changed, and/or at least some operations of the blocks 1202, 1206, 1204, 1208, 1210, 1212 described may be changed, eliminated, or combined.

Figure 13:
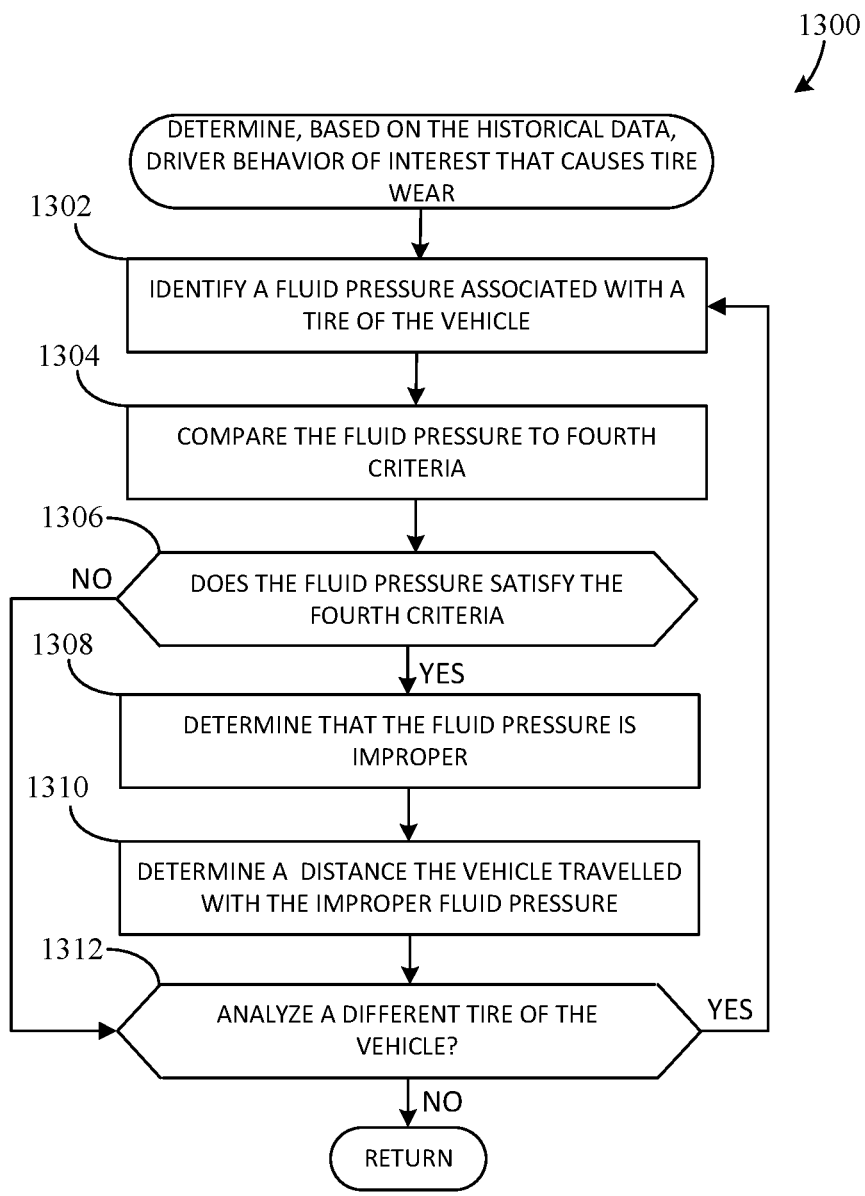

FIG. 13 is a flow diagram representative of an example method 1300 that may be executed to implement the example tire wear determination system 700 of FIG. 7 to determine driver behavior of interest that causes tire wear. The example method 1300 of FIG. 13 can be implemented in any of the vehicle 100 of FIGS. 1-5, the controller 102 of FIGS. 1 and 7, and/or the tire wear determination system 700 of FIG. 7. Example operations of blocks 1302, 1304, 1306, 1308, 1310, 1312 may be used to implement block 804 of FIG. 8. In particular, the example method 1300 of FIG. 13 is effective in determining whether the driver(s) exhibited fifth example driver behavior of interest (i.e., driving with relatively low or high tire fluid pressure) while operating the vehicle 100.

The method 1300 of FIG. 13 begins by identifying a fluid pressure associated with a tire of the vehicle (block 1302). In some examples, the tire wear determination system 700 of FIG. 7 identifies (e.g., via the data analyzer 706), based on at least a portion of the sensor data 712, a fluid pressure associated with one of the tires 114, 116, 118, 120, which is indicative of the fifth driver behavior of interest.

The method 1300 of FIG. 13 also includes comparing the fluid pressure to fourth criteria (block 1304). In some examples, the tire wear determination system 700 of FIG. 7 compares (e.g., via the data analyzer 706) the fluid pressure identified in connection with block 1302 to an eighth example threshold (e.g., a value corresponding to a relatively low fluid pressure) and a ninth example threshold (e.g., a value corresponding to t relatively high fluid pressure) of the criteria 718, which indicates to the tire wear determination system 700 whether the fifth driver behavior of interest occurred.

The method 1300 of FIG. 13 also includes determining whether the fluid pressure satisfies the fourth criteria (block 1306). In some examples, the tire wear determination system 700 of FIG. 7 determines (e.g., via the data analyzer 706), based on the comparison performed in connection with block 1304, whether the tire fluid pressure (identified in connection with block 1302) is above or below the eighth threshold and ninth threshold. In particular, the fourth criteria are considered to be satisfied if the tire fluid pressure is below the eighth threshold or above the ninth threshold.

In some examples, if the tire wear determination system 700 determines that the fourth criteria are not satisfied (block 1306: NO), control of the method 1300 proceeds to block 1312. However, if the tire wear determination system 700 determines that the fourth criteria are satisfied (block 1306: YES), control of the method 1300 proceeds to block 1308.

The method 1300 of FIG. 13 also includes determining that the fluid pressure is improper (block 1308). In some examples, the tire wear determination system 700 of FIG. 7 determines (e.g., via the data analyzer 706) that the driver(s) operated the vehicle 100 with improper fluid pressure in the one of the tire(s) 114, 116, 118, 120 (e.g., a driver of the vehicle 100 exhibited the fifth driver behavior of interest). In such examples, the tire wear determination system 700 generates and/or updates the determined behavior data 722 to include one or more of: (1) the determined improper tire fluid pressure; (2) a duration (e.g., a time interval) during which the vehicle 100 operated with the improper tire fluid pressure; and/or (3) a portion (e.g., mileage, route(s) traveled, related time stamp(s), etc.) of the sensor data 712, GPS data 714, and/or road data 716 corresponding to the vehicle 100 operating with the improper tire fluid pressure.

The method 1300 of FIG. 13 also includes determining a first distance the vehicle traveled with the improper fluid pressure (block 1310). In some examples, the tire wear determination system 700 of FIG. 7 determines (e.g., via the data analyzer 706), based on the driver behavior data 722, a first distance (e.g., a number of miles) the vehicle 100 traveled while the one of the tire(s) 114, 116, 118, 120 had the improper fluid pressure, which indicates an amount that the associated tire tread 302 wore and/or degraded resulting from the improper tire fluid pressure. In such examples, the tire wear determination system 700 generates and/or updates the determined behavior data 722 to include the first distance and/or any other appropriate data associated with such driver behavior.

The method 1300 of FIG. 13 also includes determining whether to analyze a different tire of the vehicle (block 1312). In some examples, the tire determination system 700 of FIG. 7 determines (e.g., via the data analyzer 706) whether to analyzer a different one of the tires 114, 116, 118, 120 of the vehicle 100. In some examples, if the tire determination system 700 provides a positive determination (e.g., at least one of the tires 114, 116, 118, 120 have not been analyzed) (block 1312: YES), control of the method 1300 returns to block 1302. However, if the tire determination system 700 provides a negative determination (e.g., all of the tires 114, 116, 118, 120 have been analyzed) (block 1312: NO), control of the method 1300 returns to a calling function such as the method 800 of FIG. 8 or proceeds to one of the other example methods 900, 1000, 1100, 1200, 1400.

Although the example method 1300 is described in connection with the flow diagram of FIG. 13, one or more other methods of implementing the example tire wear determination system 700 may alternatively be used. For example, the order of execution of the blocks 1302, 1304, 1306, 1308, 1310, 1312 may be changed, and/or at least some operations of the blocks 1302, 1304, 1306, 1308, 1310, 1312 described may be changed, eliminated, or combined.

Figure 14:
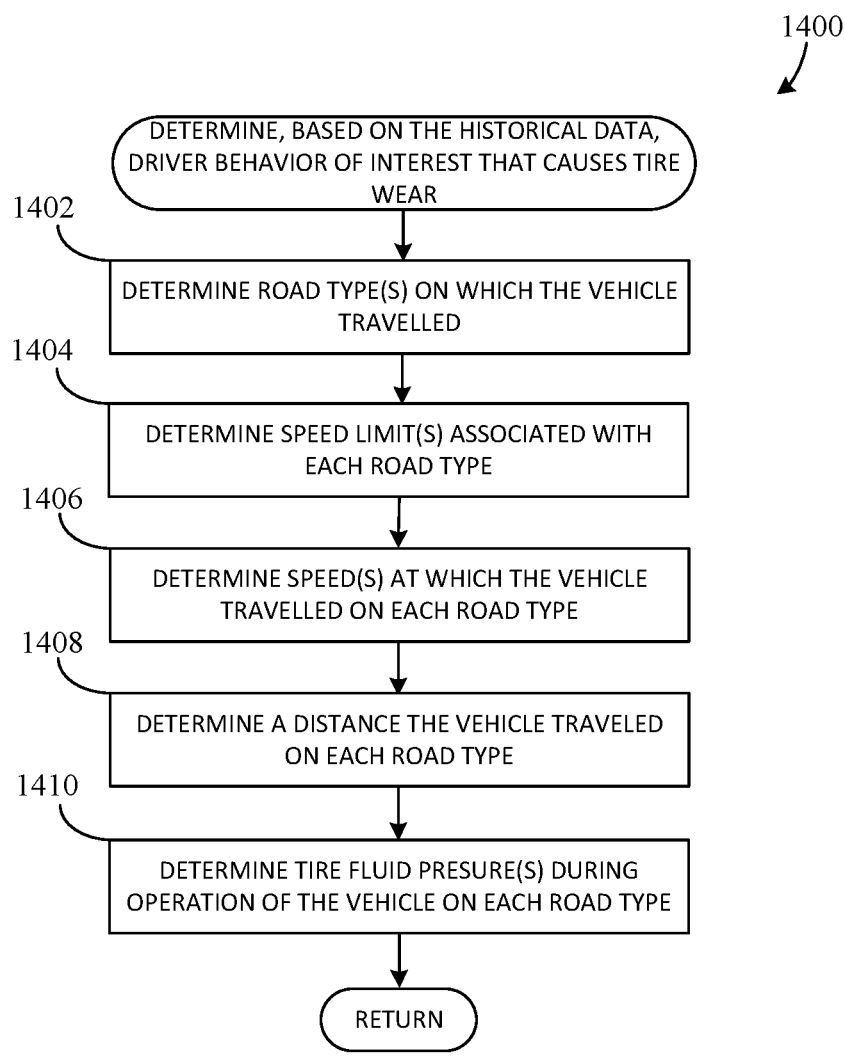

FIG. 14 is a flow diagram representative of an example method 1400 that may be executed to implement the example tire wear determination system 700 of FIG. 7 to determine driver behavior of interest that causes tire wear. The example method 1400 of FIG. 14 can be implemented in any of the vehicle 100 of FIGS. 1-5, the controller 102 of FIGS. 1 and 7, and/or the tire wear determination system 700 of FIG. 7. Example operations of blocks 1402, 1404, 1406, 1408, 1410 may be used to implement block 804 of FIG. 8. In particular, the example method 1400 of FIG. 14 is effective in determining whether the driver(s) exhibited other behavior of interest while operating the vehicle 100 as well as parameters and/or characteristics associated with such behavior.

The method 1400 of FIG. 14 begins by determining road type(s) on which the vehicle traveled (block 1402). In some examples, the tire wear determination system 700 of FIG. 7 determines (e.g., via the data analyzer 706), based on at least some of the data 712, 714, 716, 718, one or more road types (e.g., a highway, a street or local road, etc.) on which the vehicle 100 traveled.

The method 1400 of FIG. 14 also includes determining speed limit(s) associated with each road type (block 1404). In some examples, the tire wear determination system 700 of FIG. 7 determines (e.g., via the data analyzer 706), based on at least some of the data 712, 714, 716, 718, one or more speed limits (e.g., 25 MPH, 45 MPH, 60 MPH, etc.) associated with each road type determined in connection with block 1402.

The method 1400 of FIG. 14 also includes determining speed(s) at which the vehicle traveled on each road type (block 1406). In some examples, the tire wear determination system 700 of FIG. 7 determines (e.g., via the data analyzer 706), based on at least some of the data 712, 714, 716, 718, one or more speeds (e.g., an instantaneous speed, an average speed, etc.) at which the vehicle 100 traveled on each road type determined in connection block 1402.

The method 1400 of FIG. 14 also includes determining a distance the vehicle traveled on each road type (block 1408). In some examples, the tire wear determination system 700 of FIG. 7 determines (e.g., via the data analyzer 706), based on at least some of the data 712, 714, 716, 718, 722, a distance (e.g., a total number of miles) the vehicle 100 traveled on each road type determined in connection block 1402.

The method 1400 of FIG. 14 also includes determining tire fluid pressure(s) during operation of the vehicle on each road type (block 1410). In some examples, the tire wear determination system 700 of FIG. 7 determines (e.g., via the data analyzer 706), based on at least some of the data 712, 714, 716, 718, 722 one or more fluid pressures of the respective tires 114, 116, 118, 120 during operation of the vehicle 100 on each road type determined in connection block 1402. In some examples, after performing the operations in connection with block 410, control of the method 1400 of FIG. 14 returns to a calling function such as the method 800 of FIG. 8 or proceeds to one of the other example methods 900, 1000, 1100, 1200, 1300.

Although the example method 1400 is described in connection with the flow diagram of FIG. 14, one or more other methods of implementing the example tire wear determination system 700 may alternatively be used. For example, the order of execution of the blocks 1402, 1404, 1406, 1408, 1410 may be changed, and/or at least some operations of the blocks 1402, 1404, 1406, 1408, 1410 described may be changed, eliminated, or combined.

Figure 15:
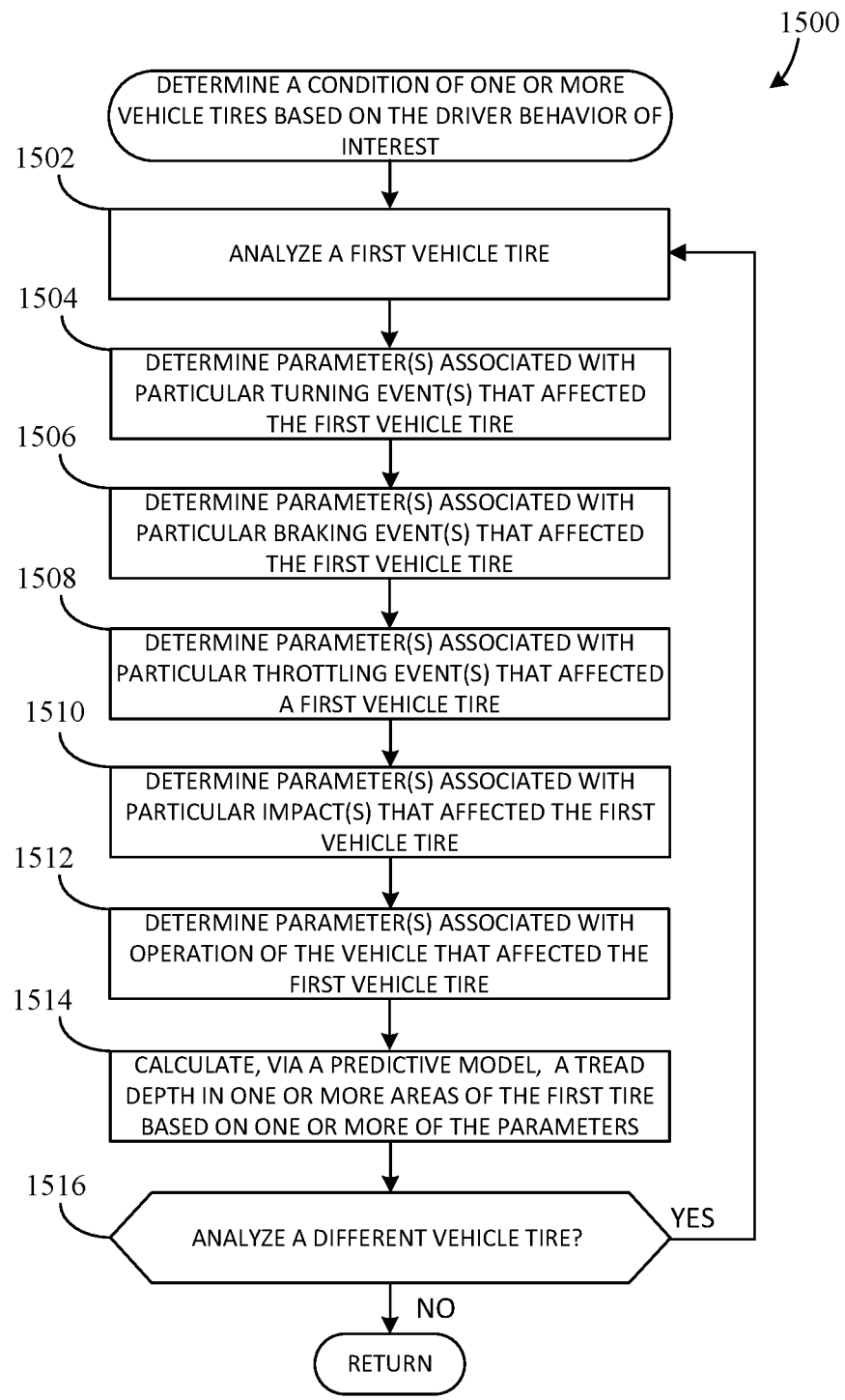
FIG. 15 is a flow diagram representative of an example method that may be executed to implement the example tire wear determination system of FIG. 7 to determine a condition of a vehicle tire based on driver behavior of interest.

FIG. 15 is a flow diagram representative of an example method 1500 that may be executed to implement the example tire wear determination system 700 of FIG. 7 to determine a condition of a vehicle tire based on the disclosed driver behavior of interest. The example method 1500 of FIG. 15 can be implemented in any of the vehicle 100 of FIGS. 1-5, the controller 102 of FIGS. 1 and 7, and/or the tire wear determination system 700 of FIG. 7. Example operations of blocks 1502, 1504, 1506, 1508, 1510, 1512, 1514, 1516 may be used to implement block 808 of FIG. 8. In particular, the example method 1500 of FIG. 15 is effective in determining and/or predicting (e.g., in real-time) groove or tread depth (e.g., the depth 608 of FIG. 6) in one or more areas (e.g., one or more of the areas 612, 614, 616) of the vehicle tire(s) 114, 116, 118, 120.

The method 1500 of FIG. 15 begins by analyzing a first vehicle tire (block 1502). In some examples, the tire wear determination system 700 of FIG. 7 analyzes (e.g., via the data analyzer 706) a first one of the tires 114, 116, 118, 120 of the vehicle 100. That is, the tire wear determination system 700 analyzes one or more portions of the data 712, 714, 716, 718, 722 associated with the first one of the tires 114, 116, 118, 120.

The method 1500 of FIG. 15 also includes determining parameter(s) associated with particular turning event(s) that affected the first vehicle tire (block 1504). In some examples, the tire wear determination system 700 of FIG. 7 determines (e.g., via the data analyzer 706), based on at least some of the data 712, 714, 716, 718, 722, one or more parameters associated with the first driver behavior of interest 200 that affected the first one of the tire(s) 114, 116, 118, 120. For example, the tire wear determination system 700 determines a number of occurrences of sudden and/or excessive turning events (e.g., determined in connection with the method 900 of FIG. 9) that predictably wore and/or degraded tread of the first one of the tire(s) 114, 116, 118, 120. Further, in another example, the tire wear determination system 700 determines a number of skid marks generated by the first one of the tire(s) 114, 116, 118, 120 resulting from the sudden and/or excessive turning events. Further still, in another example, the tire wear determination system 700 determines lengths (e.g., the length 206 of the skid mark 202 of FIG. 2) of the respective skid marks and/or one or more other skid mark parameters.

The method 1500 of FIG. 15 also includes determining parameter(s) associated with particular braking event(s) that affected the first vehicle tire (block 1506). In some examples, the tire wear determination system 700 of FIG. 7 determines (e.g., via the data analyzer 706), based on at least some of the data 712, 714, 716, 718, 722, one or more parameters associated with the second driver behavior of interest 300 that affected the first one of the tire(s) 114, 116, 118, 120. For example, the tire wear determination system 700 determines a number of occurrences of sudden and/or excessive braking events (e.g., determined in connection with the method 1000 of FIG. 10) that predictably wore and/or degraded tread of the first one of the tire(s) 114, 116, 118, 120. Further, in another example, the tire wear determination system 700 determines a number of skid marks generated by the first one of the tire(s) 114, 116, 118, 120 resulting from the sudden and/or excessive braking events. Further still, in another example, the tire wear determination system 700 determines lengths (e.g., one or more of the length(s) 310, 312, 314 of the skid mark(s) 302, 304 of FIG. 3) of the respective skid marks and/or one or more other skid mark parameters.

The method 1500 of FIG. 15 also includes determining parameter(s) associated with particular throttling event(s) that affected the first vehicle tire (block 1508). In some examples, the tire wear determination system 700 of FIG. 7 determines (e.g., via the data analyzer 706), based on at least some of the data 712, 714, 716, 718, 722, one or more parameters associated with the third driver behavior of interest 400 that affected the first one of the tire(s) 114, 116, 118, 120. For example, the tire wear determination system 700 determines a number of occurrences of sudden and/or excessive throttling events (e.g., determined in connection with the method 1100 of FIG. 11) that predictably wore and/or degraded tread of the first one of the tire(s) 114, 116, 118, 120. Further, in another example, the tire wear determination system 700 determines a number of burnout marks generated by the first one of the tire(s) 114, 116, 118, 120 resulting from the respective sudden and/or excessive throttling events. Further still, in another example, the tire wear determination system 700 determines lengths (e.g., one or more of the length(s) 406, 408 of the burnout mark(s) 402, 404 of FIG. 4) of the respective burnout marks and/or one or more other burnout mark parameters.

The method 1500 of FIG. 15 also includes determining parameter(s) associated with particular impact(s) that affected the first vehicle tire (block 1510). In some examples, the tire wear determination system 700 of FIG. 7 determines (e.g., via the data analyzer 706), based on at least some of the data 712, 714, 716, 718, 722, one or more parameters associated with the fourth driver behavior of interest 500 that affected the first one of the tire(s) 114, 116, 118, 120. For example, the tire wear determination system 700 determines a number of impacts that predictably wore and/or degraded tread of the first one of the tires 114, 116, 118, 120. Further, in another example, the tire wear determination system 700 determines a severity of each impact.

The method 1500 of FIG. 15 also includes determining parameter(s) associated with operation of the vehicle that affected the first vehicle tire (block 1512). In some examples, the tire wear determination system 700 of FIG. 7 determines (e.g., via the data analyzer 706), based on at least some of the data 712, 714, 716, 718, 722, one or more parameters associated with operation of the vehicle 100 that affected the first one of the tires 114, 116, 118, 120 such as, for example, the distance determined in connection with block 1310 of FIG. 1300 and/or the parameter(s) determined in connection with block(s) 1402, 1404, 1406, 1408, 1410 of FIG. 14.

The method 1500 of FIG. 15 also includes calculating, via a predictive model, a tread depth in one or more areas of the first tire based on one or more of the parameters (block 1514). In some examples, the tire wear determination system 700 of FIG. 7 calculates (e.g., via the data analyzer 706), via the model(s)/equation(s) 720, a groove or tread depth (e.g., the depth 608 of FIG. 6) in one or more areas (e.g., one or more of the areas 612, 614, 616 of FIG. 6) of the first one of the tires 114, 116, 118, 120 based on one or more of above disclosed parameters determined in connection with blocks 1504, 1506, 1508, 1510, 1512. For example, the tire wear determination system 700 calculates a first tread depth in a first area (e.g., the first area 612 and/or the second area 614 of FIG. 6) of the first one of the tires 114, 116, 118, 120 and a second tread depth, different from the first tread depth, in a second area (e.g., the third area 616 of FIG. 6) of the first one of the tires 114, 116, 118, 120.

Thus, in some examples, the tire wear determination system 700 calculates the tread depth based on the number of turning events and/or skid mark parameters determined in connection with FIG. 9 and/or block 1504. Further, in some examples, the tire wear determination system 700 calculates the tread depth based on the number of braking events and/or skid mark parameters determined in connection with FIG. 10 and/or block 1506. Further still, in some examples, the tire wear determination system 700 calculates the tread depth based on the number of throttling events and/or burnout mark parameters determined in connection with FIG. 11 and/or block 1508. Further still, in some examples, the tire wear determination system 700 calculates the tread depth based on the number of tire impacts determined in connection with FIG. 12 and/or block 1510. Further still, in some examples, the tire wear determination system 700 calculates the tread depth based on the distance the vehicle 100 traveled with improper tire fluid pressure determined in connection with FIG. 13 and/or block 1512. Further still, in some examples, the tire wear determination system 700 calculates the tread depth based on the road type(s), the vehicle speed(s), the distance(s) traveled, and/or the tire fluid pressure(s) determined in connection with FIG. 14 and/or block 1512.

The method 1500 of FIG. 15 also includes determining whether to analyze a different vehicle tire (block 1516). In some examples, the tire wear determination system 700 of FIG. 7 determines (e.g., via the data analyzer 706) whether to analyze a different one of the tires 114, 116, 118, 120 of the vehicle 100. If the tire wear determination system 700 provides a positive determination (e.g., at least one of the tires 114, 116, 118, 120 has not yet been analyzed) (block 1516: YES), control of the method 1500 of FIG. 15 returns to block 1502. However, if the tire wear determination system 700 provides a negative determination (e.g., all of the tires 114, 116, 118, 120 have been analyzed) (block 1516: NO), control of the method returns to a calling function such as the method 800 of FIG. 8.

Although the example method 1500 is described in connection with the flow diagram of FIG. 15, one or more other methods of implementing the example tire wear determination system 700 may alternatively be used. For example, the order of execution of the blocks 1502, 1504, 1506, 1508, 1510, 1512, 1514, 1516 may be changed, and/or at least some operations of the blocks 1502, 1504, 1506, 1508, 1510, 1512, 1514, 1516 described may be changed, eliminated, or combined.

Figure 16:
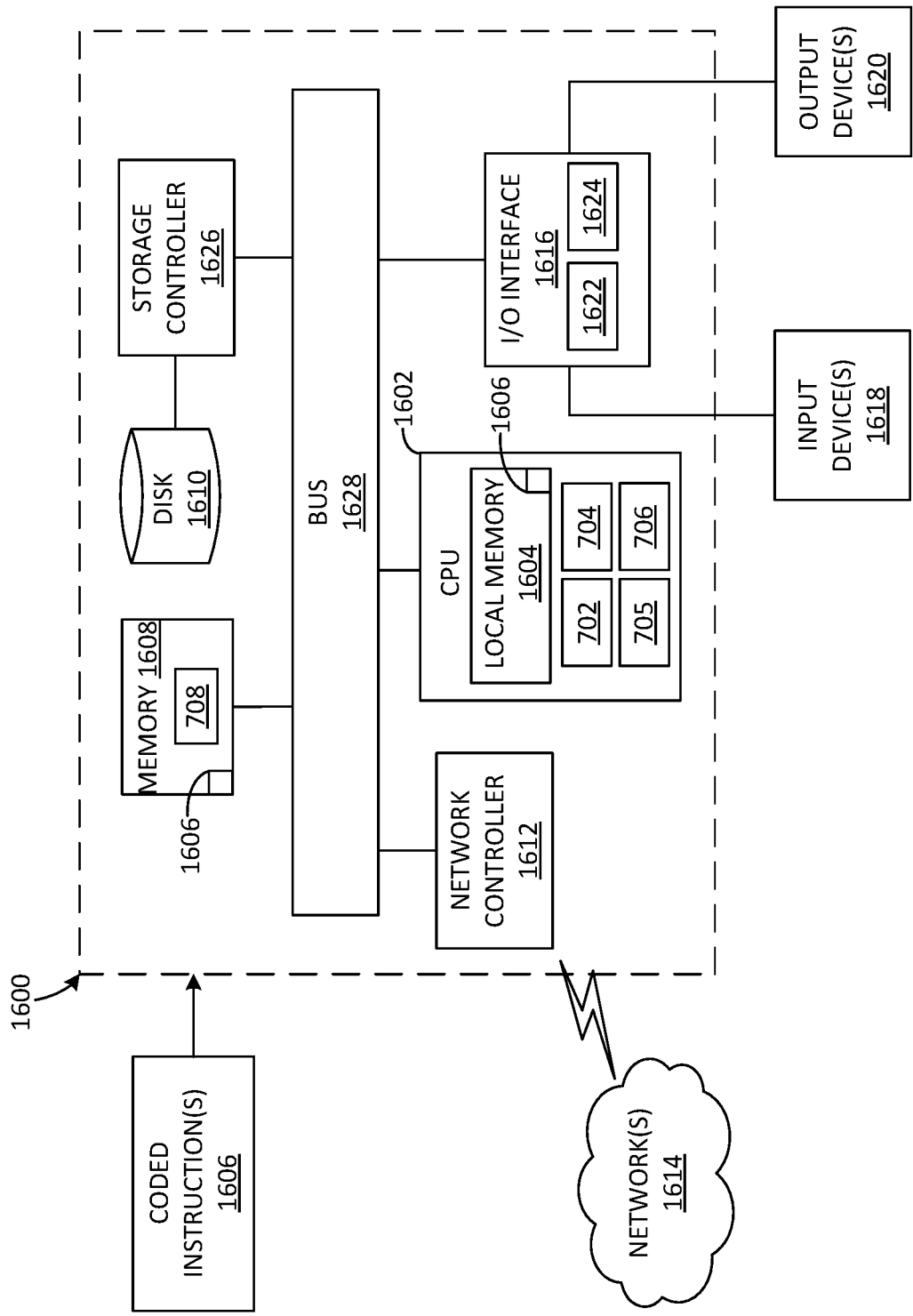
FIG. 16 is a block diagram of an example processor platform structured to execute instructions to carry out the example methods of FIGS. 8-15 and/or, more generally, to implement the example tire wear determination system of FIG. 7.

FIG. 16 is a block diagram of an example processor platform 1600 capable of executing instructions to implement the methods of FIGS. 8-15 and the tire wear determination system 700 of FIG. 7. For example, the processor platform 1600 can be a personal computer, a server, a mobile device (e.g., a cell phone, a smart phone, a tablet, etc.) or any other type of computing device. According to the illustrated example of FIG. 16, the processor platform 1600 includes a central processing unit (CPU) 1602 (sometimes referred to as a processor), which is hardware (e.g., one or more integrated circuits, one or more logic circuits, one or more microprocessors, etc.). The CPU 1602 of FIG. 16 includes a local memory 1604 such as, for example, a cache. According to the illustrated example of FIG. 16, the CPU 1602 implements the example sensor interface 702, the example user interface 704, the example network interface 705, and the example data analyzer 706.

Coded instruction(s) 1606 to implement the methods of FIGS. 8-15 may be stored in a main memory 1608 of the processor platform 1600. The memory 1608 may include a volatile memory (e.g., random access memory device(s) such as Dynamic Random Access Memory (DRAM)) and a non-volatile memory (e.g., flash memory). Such processes and/or instructions may also be stored on a storage medium disk 1610 associated with the processor platform 1600, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processor platform 1600 communicates, such as a server or computer.

Further, the claimed advancements may be provided as a utility application, background daemon, or component of an operating system, or combination thereof, executing in conjunction with the CPU 1602 and an operating system such as, for example, Microsoft Windows 7, UNIX, Solaris, LINUX, Apple MAC-OS or any other system(s) known to those skilled in the art.

The hardware elements in order to achieve the processor platform 1600 may be realized by various circuitry elements, known to those skilled in the art. For example, the CPU 1602 may be a Xenon or Core processor from Intel of America or an Opteron processor from AMD of America, or may be other processor types that would be recognized by one of ordinary skill in the art. Alternatively, the CPU 1602 may be implemented on an FPGA, ASIC, PLD or using discrete logic circuits, as one of ordinary skill in the art would recognize. Further, the CPU 1602 may be implemented as multiple processors cooperatively working in parallel to perform the instructions of the inventive processes described above.

In some examples, the processor platform 1600 of FIG. 16 also includes a network controller 1612 such as, for example, an Intel Ethernet PRO network interface card from Intel Corporation of America for interfacing with one or more networks 1614. As can be appreciated, the network(s) 1614 can be one or more public networks (e.g., the Internet), private networks (e.g., a local area network (LAN), a wide area network (WAN), etc.) and/or sub-networks (e.g., a public switched telephone network (PSTN), an integrated services digital network (ISDN), etc.). The network(s) 1614 can also be wired, such as an Ethernet network, or can be wireless such as a cellular network including EDGE, 3G and 4G wireless cellular systems. The wireless network can also be WiFi, Bluetooth, or any other wireless form of communication that is known.

The processor platform 1600 of FIG. 16 includes a general purpose I/O interface circuit 1616 that interfaces and/or otherwise communicates with one or more input devices 1618 and/or one or more output devices 1620. The I/O interface circuit 1616 of FIG. 16 may be implemented as an Ethernet interface, a universal serial bus (USB), a PCI express interface, and/or any other type of standard interface.

The input devices 1618 are connected to the I/O interface 1616 and may include, for example, a keyboard, a mouse, a touchscreen, a button, a microphone, a voice recognition system, a camera, and/or any other suitable device(s) for enabling a person to input data and/or commands to the CPU 1602. As such, in some examples, the I/O interface circuit 1616 typically includes a display controller 1622 such as, for example, a NVIDIA GeForce GTX or Quadro graphics adaptor from NVIDIA Corporation of America for interfacing with a display (e.g., a Hewlett Packard HPL2445w LCD monitor).

The output device(s) 1620 are also connected to the I/O interface circuit 1616 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a person. As such, in some examples, the I/O interface circuit includes a sound controller 1624 such as, for example, Sound Blaster X-Fi Titanium from Creative, to interface with a speaker and/or a microphone.

The processor platform 1600 of FIG. 16 also includes a general purpose storage controller 1626 that connects the storage medium disk 1610 with a communication bus 1628. The storage controller 1626 may also control access to the memory 1608. The communication bus 1628 of FIG. 16 may be an ISA, EISA, VESA, PCI, etc. for interconnecting all of the components of the processor platform 1600. For example, the CPU 1602 communicates with the main memory 1608 via the bus 1628.

It will be appreciated that the systems, apparatus, and methods disclosed in the foregoing description provide numerous advantages. Examples disclosed herein rapidly determine a condition of vehicle tire tread as well as automatically assist a person in maintaining one or more respective vehicle tires. Further, disclosed examples reduce lead time and improve accuracy in determining vehicle tire wear.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An apparatus, comprising:
a vehicle controller configured to:
determine, based on data associated with operation of a vehicle, behavior of one or more drivers of the vehicle that causes tire wear;
calculate, based on the behavior, a condition of a tire of the vehicle; and
generate, via an output device, a notification indicating the condition of the tire to a user,
wherein the vehicle controller is further configured to determine a number of occurrences of the behavior and calculate a tread depth in one or more areas of the tire based on the number of occurrences.

2. The apparatus of claim 1, wherein the condition of the tire includes a first area of the tire that is worn and a second area of the tire that is worn less relative to the first area.

3. The apparatus of claim 1, wherein the vehicle controller is configured to determine, based on the data, a target time corresponding to installation or maintenance of the tire, the behavior occurring after the target time.

4. The apparatus of claim 1, wherein the behavior includes turning events of the vehicle, braking events of the vehicle, throttling events of the vehicle, tire impact events of the vehicle, and driving the vehicle with relatively low or high tire fluid pressure.

5. The apparatus of claim 4, wherein the vehicle controller is configured to:
identify, based on the data, a transverse acceleration and a wheel speed associated with the vehicle;
determine, based on the transverse acceleration and the wheel speed, a number of the turning events that affected the tire; and
calculate, based on the number of the turning events, the tread depth.

6. The apparatus of claim 5, wherein the vehicle controller is configured to:
determine, based on the transverse acceleration and the wheel speed, skid mark parameters resulting from respective ones of the turning events; and
calculate, based on the skid mark parameters, the tread depth.

7. The apparatus of claim 4, wherein the vehicle controller is configured to:
identify, based on the data, a longitudinal deceleration and a wheel speed associated with the vehicle;
determine, based on the longitudinal deceleration and the wheel speed, a number of the braking events that affected the tire; and
calculate, based on the number of the braking events, the tread depth.

8. The apparatus of claim 7, wherein the vehicle controller is configured to:
determine, based on the longitudinal deceleration and the wheel speed, skid mark parameters resulting from respective ones of the braking events; and
calculate, based on the skid mark parameters, the tread depth.

9. The apparatus of claim 4, wherein the vehicle controller is configured to:
identify, based on the data, a longitudinal acceleration and a wheel speed associated with the vehicle;
determine, based on the longitudinal acceleration and the wheel speed, a number of the throttling events that affected the tire; and
calculate, based on the number of the throttling events, the tread depth.

10. The apparatus of claim 9, wherein the vehicle controller is configured to:
determine, based on the longitudinal acceleration and the wheel speed, burnout mark parameters resulting from respective ones of the throttling events; and calculate, based on the burnout mark parameters, the tread depth.

11. The apparatus of claim 4, wherein the controller is configured to:
   identify, based on the data, a vertical acceleration associated with the vehicle;
   determine, based on the vertical acceleration, a number of the tire impact events that affected the tire; and
   calculate, based on the number of the tire impact events, the tread depth.

12. A non-transitory machine-readable storage medium comprising instructions that, when executed, cause a processor to at least:
   determine, based on data associated with operation of a vehicle, behavior of one or more drivers of the vehicle that causes tire wear;
   calculate, based on the behavior, a condition of a tire of the vehicle; and
   generate, via an output device, a notification indicating the condition of the tire to a user,
   wherein the instructions further cause the processor to determine a number of occurrences of the behavior and calculate a tread depth in one or more areas of the tire based on the number of occurrences.

13. The non-transitory machine-readable storage medium of claim 12, wherein the condition of the tire includes a first area of the tire that is worn and a second area of the tire that is worn less relative to the first area.

14. The non-transitory machine-readable storage medium of claim 12, wherein the instructions cause the processor to determine, based on the data, a target time corresponding to installation or maintenance of the tire, the behavior occurring after the target time.

15. The non-transitory machine-readable storage medium of claim 12, wherein the behavior includes turning events of the vehicle, braking events of the vehicle, throttling events of the vehicle, tire impact events of the vehicle, and driving the vehicle with relatively low or high tire fluid pressure.

16. The non-transitory machine-readable storage medium of claim 15, wherein the instructions cause the processor to:
   identify, based on the data, a transverse acceleration and a wheel speed associated with the vehicle;
   determine, based on the transverse acceleration and the wheel speed, a number of the turning events that affected the tire; and
   calculate, based on the number of the turning events, the tread depth.

17. The non-transitory machine-readable storage medium of claim 16, wherein the instructions cause the processor to:
   determine, based on the transverse acceleration and the wheel speed, skid parameters resulting from respective ones of the turning events; and
   calculate, based on the skid parameters, the tread depth.

18. The non-transitory machine-readable storage medium of claim 15, wherein the instructions cause the processor to:
   identify, based on the data, a longitudinal deceleration and a wheel speed associated with the vehicle;
   determine, based on the longitudinal deceleration and the wheel speed, a number of the braking events that affected the tire; and
   calculate, based on the number of the braking events, the tread depth.

19. The non-transitory machine-readable storage medium of claim 18, wherein the instructions cause the processor to:
   determine, based on the longitudinal deceleration and the wheel speed, skid parameters resulting from respective ones of the braking events; and
   calculate, based on the skid parameters, the tread depth.

20. The non-transitory machine-readable storage medium of claim 15, wherein the instructions cause the processor to:
   identify, based on the data, a longitudinal acceleration and a wheel speed associated with the vehicle;
   determine, based on the longitudinal acceleration and the wheel speed, a number of the throttling events that affected the tire; and
   calculate, based on the number of the throttling events, the tread depth.

* * * * *